(12) United States Patent
Shimamoto et al.

(10) Patent No.: US 9,185,393 B2
(45) Date of Patent: *Nov. 10, 2015

(54) IMAGE CAPTURING DEVICE, SEMICONDUCTOR INTEGRATED CIRCUIT, AND IMAGE CAPTURING METHOD

(71) Applicant: PANASONIC CORPORATION, Osaka (JP)

(72) Inventors: Takeshi Shimamoto, Osaka (JP); Takashi Kawamura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 318 days.

This patent is subject to a terminal disclaimer.

(21) Appl. No.: 13/882,548

(22) PCT Filed: Oct. 11, 2012

(86) PCT No.: PCT/JP2012/006527
§ 371 (c)(1),
(2) Date: Apr. 30, 2013

(87) PCT Pub. No.: WO2013/054527
PCT Pub. Date: Apr. 18, 2013

(65) Prior Publication Data
US 2014/0146140 A1    May 29, 2014

(30) Foreign Application Priority Data

Oct. 12, 2011 (JP) .................... 2011-224655

(51) Int. Cl.
*H04N 13/02* (2006.01)
*G02B 7/08* (2006.01)
*H04N 5/238* (2006.01)
*H04N 5/232* (2006.01)
*H04N 5/235* (2006.01)

(52) U.S. Cl.
CPC .............. *H04N 13/0296* (2013.01); *G02B 7/08* (2013.01); *H04N 5/238* (2013.01); *H04N 5/23212* (2013.01); *H04N 5/2356* (2013.01)

(58) Field of Classification Search
CPC . H04N 5/23212; H04N 5/238; H04N 5/2356; G02B 7/08
USPC .................................................. 348/345–357
See application file for complete search history.

(56) References Cited

U.S. PATENT DOCUMENTS

| 5,148,502 | A | 9/1992 | Tsujiuchi et al. |
| 7,711,259 | B2 | 5/2010 | Daley |
| 8,890,996 | B2 * | 11/2014 | Shimamoto ................... 348/348 |
| 2008/0056703 | A1 * | 3/2008 | Lin et al. ....................... 396/127 |

FOREIGN PATENT DOCUMENTS

| DE | 2 301 800 A1 | 10/1974 |
| JP | 04-308975 A | 10/1992 |
| JP | 05-027084 B | 4/1993 |
| JP | 3084130 B | 6/2000 |
| JP | 3191928 B | 5/2001 |
| JP | 2001-257932 A | 9/2001 |
| JP | 2009-111774 A | 5/2009 |
| JP | 2012-005063 A | 1/2012 |

OTHER PUBLICATIONS

International Search Report for corresponding International Application No. PCT/JP2012/006527 mailed Nov. 13, 2012.
Nagahara et al., "Flexible Depth of Field Photography", European Conference on Computer Vision (ECCV), Oct. 16, Morning Session 2: Computational Photography (2008).
Matsui et al., "Focus Sweep Imaging for Depth From Defocus", Information Processing Society of Japan, SIG Notes, 2010-CVIM-174 No. 6 (2010).

* cited by examiner

*Primary Examiner* — Christopher K Peterson
(74) *Attorney, Agent, or Firm* — Renner, Otto, Boisselle & Sklar, LLP

(57) ABSTRACT

An image capturing device in one aspect of the present invention includes: an imaging device; a lens optical system including a focus lens; a driving section for driving one of the imaging device and the focus lens; a displacement control section for controlling displacement of the imaging device or the focus lens to be driven based on a predetermined displacement pattern; a diaphragm having an aperture having a size which can be changed and being provided in the lens optical system; an aperture control section for controlling the size of the aperture of the diaphragm; a synchronizing section for controlling the displacement control section and the aperture control section based on exposure timing; and an image capturing parameter determining section for determining the exposure time, the size of the diaphragm aperture, and the displacement pattern, wherein: the predetermined displacement pattern includes a first-type displacement pattern and a second-type displacement pattern by which the imaging device or the focus lens is displaced over different ranges between a first focus position and a second focus position in an image capturing scene; the first-type displacement pattern and the second-type displacement pattern are repeated alternately; and the aperture control section controls the diaphragm so as to have a first aperture and a second aperture having a different size from that of the first aperture in the first-type displacement pattern and the second-type displacement pattern based on timing from the synchronizing section.

19 Claims, 26 Drawing Sheets

WIDE ANGLE　TELEPHOTO
END　　　　　END

IMAGE CAPTURING DEVICE, SEMICONDUCTOR INTEGRATED CIRCUIT, AND IMAGE CAPTURING METHOD

TECHNICAL FIELD

The present application relates to an image capturing device capable of capturing a video or a series of still images having three-dimensional information, based on a plurality of images captured from a single viewpoint.

BACKGROUND ART

In order to obtain three-dimensional information from a plurality of images captured from a single viewpoint, a method has been proposed in which extended depth of field (hereinafter, "EDOF") is combined with a scene depth measurement technique.

Various methods have been proposed as schemes for realizing extended depth of field (hereinafter referred to as "EDOF"). For example, a method has been proposed (Non-Patent Document 1) for performing a focus sweep operation of moving the focus lens or the imaging device during the exposure time, for example, and convoluting an image that is uniformly focused in the depth direction (which is equivalent to making the blur uniform across different depths), obtaining an EDOF image by performing an image restoration process using a blur pattern obtained in advance through a measurement or simulation. This method is referred to as flexible DOF (hereinafter referred to as "F-DOF").

F-DOF is known as a scheme capable of obtaining a good image quality, and also has a high EDOF effect. Since the off-axis characteristics are also dependent on the lens characteristics themselves, it is possible to easily enhance the performance. Note however that since it is necessary that the same object is convoluted onto the same image position even if the focus position is moved during exposure, it needs to be an image-side telecentric lens as an optical condition.

One field in which the EDOF technique is applied is microscopy. When capturing an image with a microscope, the object to be captured is a stationary object, and therefore it is possible to use some time to capture an image. Therefore, the focal stack scheme has long been used. In this scheme, a plurality of images of different focus positions are captured, and different areas believed to be in focus are extracted from the images and synthesized together, obtaining an EDOF image. Since these operations require labor and time, techniques have been proposed in which the F-DOF scheme is also used in combination (Patent Document Nos. 1 to 4). Where F-DOF is used in a microscope application, the sample, which is the object, or the lens barrel is used during the exposure. Where it is assumed that a post-exposure image restoration process is performed, the object or the lens barrel is moved so that the blur of the image is always uniform. It has been known that appropriately controlling this manner of movement is practical because it is then possible to use an image restoration process method using a single blur pattern (Patent Document No. 5). For this purpose, when the imaging device is moved, the imaging device is moved at a uniform velocity. Where the focus lens is moved, it is necessary to realize displacement of the focus lens that is equivalent to the image capturing surface moving at a uniform velocity (Non-Patent Document No. 1). It is known that the pattern of movement may be from the far-side focus end position to the near-side focus end position, or the opposite thereto.

CITATION LIST

Patent Literature

Patent Document No. 1: German Patent No. 2301800
Patent Document No. 2: Japanese Patent Publication for Opposition No. 5-27084
Patent Document No. 3: Japanese Patent No. 3191928
Patent Document No. 4: U.S. Pat. No. 7,711,259
Patent Document No. 5: Japanese Patent No. 3084130

Non-Patent Literature

Non-Patent Document No. 1: H. Nagahara, S. Kuthirummal, C. Zhou and S. Nayar, "Flexible Depth of Field Photography", European Conference on Computer Vision (ECCV), October 16th, Morning Session 2: Computational Photography (2008)
Non-Patent Document No. 2: Shuhei Matsui, Hajime Nagahara, Rinichiro Taniguchi, "Focus Sweep Imaging for Depth From Defocus", IPSJ SIG Technical Reports, 2010-CVIM-174 No. 6 (2010)

SUMMARY OF INVENTION

Technical Problem

Where the EDOF technique is used in a digital still camera or a digital video camera, it is preferred that the EDOF image capturing operation can be done even when capturing a video. The present application provides an image capturing device capable of capturing an EDOF video of a high image quality, an integrated circuit and an image capturing method for use with the image capturing device.

Solution to Problem

An image capturing device in one aspect of the present invention includes: an imaging device including a plurality of photoelectric conversion elements arranged in two dimensions to form an image capturing surface, wherein the plurality of photoelectric conversion elements are exposed and the imaging device generates an image signal by reading out electrical signals from the plurality of photoelectric conversion elements; a lens optical system including a focus lens for collecting light toward the imaging device; a driving section for driving one of the imaging device and the focus lens so as to change a distance between the imaging device and the focus lens; a displacement control section configured to, by outputting a command to the driving section, control displacement of the imaging device or the focus lens to be driven based on a predetermined displacement pattern; a diaphragm having an aperture whose size can be changed and provided in the lens optical system; an aperture control section configured to control the size of the aperture of the diaphragm; a synchronizing section configured to control the displacement control section and the aperture control section based on exposure timing of the imaging device; and an image capturing parameter determining section for determining a duration of the exposure, the size of the diaphragm aperture, and the displacement pattern, wherein: the predetermined displacement pattern includes a first-type displacement pattern and a second-type displacement pattern by which the imaging device or the focus lens is displaced over different ranges between a first focus position of the focus lens or the imaging device at which focus is at a first object distance in an image capturing scene, and a second focus position of the focus lens or the imaging device at which focus is at a second object distance in the image capturing scene; in the predetermined displacement pattern, the first-type displacement pattern and the second-type displacement pattern are repeated alternately; and the aperture control section controls the diaphragm so as to have a first aperture and a second aperture having a different size from that of the first aperture in the first-type displacement pattern and the second-type displacement pattern based on timing from the synchronizing section.

Advantageous Effects of Invention

With the image capturing device disclosed in the present application, an image capturing operation by a sweep operation in a first-type displacement pattern for obtaining an all-in-focus image and an image capturing operation by a sweep operation in a second-type displacement pattern for obtaining depth information are repeated alternately, thus enabling an image capturing operation by which a high image quality of an all-in-focus image and a high depth measurement precision are both realized.

DESCRIPTION OF EMBODIMENTS

Figure 23:
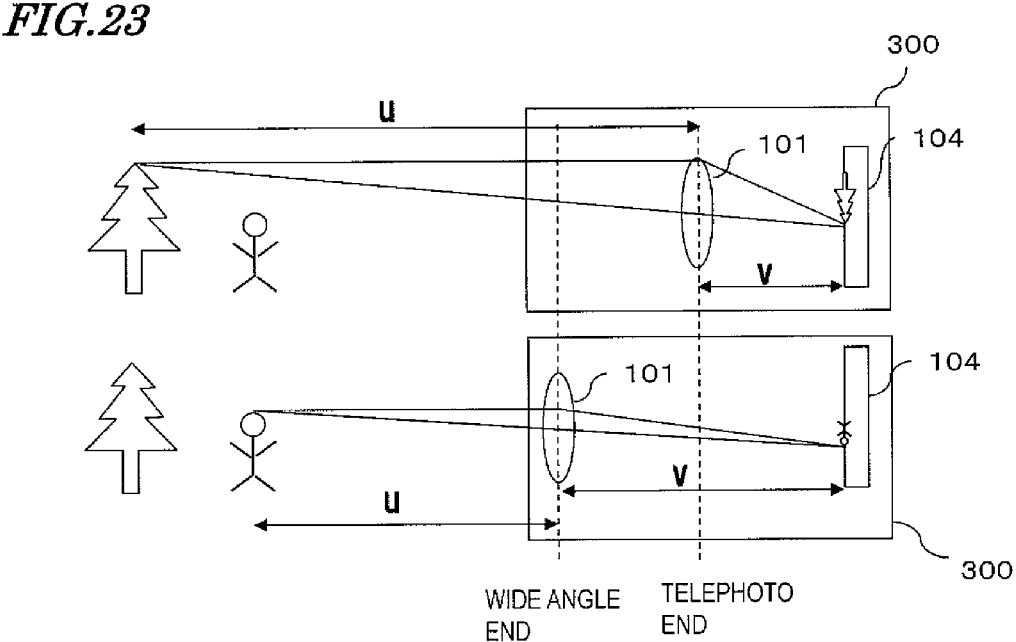
FIG. 23 is a diagram showing a positional relationship between the object, the focus lens, and the imaging device.
Figure 24:
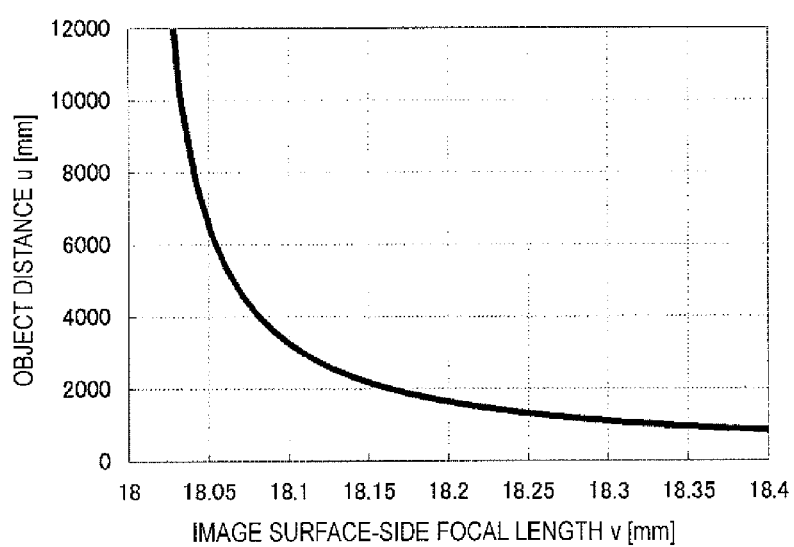
FIG. 24 is a graph showing an example of a relationship between the object distance u and the image surface-side focal length v.

First, the positional relationship between the focus position in an image capturing scene and the focus lens and the imaging device will be described. FIG. 23 is a schematic diagram showing the positional relationship between the object included in the image capturing scene, and a focus lens 101 and an imaging device 104 in an image capturing device 300. In the image capturing scene, when an object at a position near the image capturing device 300 is focused, the distance u from the object focused on the image capturing surface and the focus lens 101 of the image capturing device 300 is relatively short, and the distance v between the focus lens 101 and the imaging device 104 is relatively long. When one of the objects included in the image capturing scene that is at a position farther away from the image capturing device 300 is focused, the distance u from the object focused on the image capturing surface to the focus lens 101 of the image capturing device 300 is relatively long, and the distance v between the focus lens 101 and imaging device is shortest. Note that in FIG. 23, for the purpose of illustration, the distance between the focus lens 101 and the imaging device 104 is shown to be longer with respect to the distance between objects and the image capturing device 300. Thus, the position to be focused in the image capturing scene is determined by the distance between the focus lens 101 and the image capturing surface of the imaging device 104. Where the distance between the object and the focus lens 101 is u, the distance between the focus lens 101 and the imaging device 104 is v, and the focal length of the focus lens 101 is f, the following relationship:

$$1/f = 1/u + 1/v \qquad \text{(Expression 1)}$$

generally holds true from a lens formula. Where the lens optical system used in image capturing includes a plurality of focus lenses, the distances u and v are considered at the position of the lens principal point. As an example, a relationship between u and v where f is 18 [mm] is shown in FIG. 24. As the focus lens 101 is displaced, the distance v between the lens principal point and the imaging device changes. As can be seen from FIG. 24, the object-side distance u decreases as the image surface-side distance v increases. As can be seen from Expression 1, the distance u and the distance v are neither in proportional relation nor in inverse relation.

While the distance v is changed by changing the position of the focus lens 101 in FIG. 23, the distance v changes also by moving the imaging device 104. Based on the relationship described above, the focus position in the image capturing scene is herein discussed in terms of the position of the focus lens. Herein, the wide angle end refers to the position of the focus lens 101 or the imaging device 104 when the focus lens 101 or the imaging device 104 has been moved so that one of the objects included in the image capturing scene that is closest to the image capturing device 300 forms an image on the image capturing surface of the imaging device 104. The telephoto end refers to the position of the focus lens 101 or the imaging device 104 when the focus lens 101 or the imaging device 104 has moved so that one of the objects included in the image capturing scene that is farthest away from the image capturing device 300 forms an image on the image capturing surface of the imaging device 104.

Figure 25:
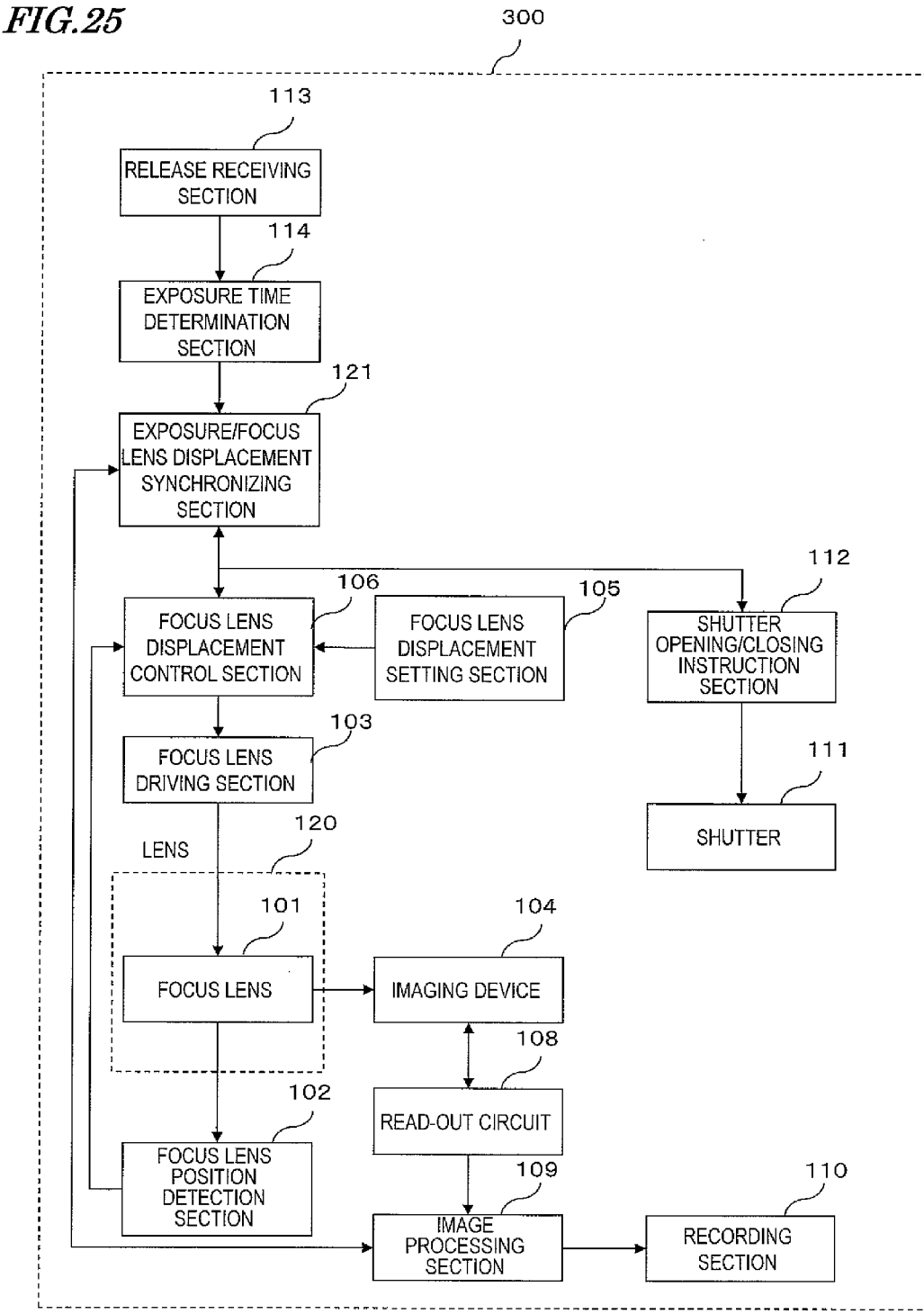
FIG. 25 is a block configuration diagram of an image capturing device examined by the present inventors.

Next, a method for obtaining an image by the F-DOF scheme will be described. FIG. 25 shows a configuration of the image capturing device 300 capable of displacing the focus lens during the exposure time. The image capturing device 300 includes a lens optical system 120 including the focus lens 101, a focus lens driving section 103 for driving the focus lens 101, and the imaging device 104. By changing the position of the focus lens 101, it is possible to change the distance from the imaging device 104 and to change the focus distance. Where it is considered that the focus lens 101 is fixed, changing the focus distance is equivalent to changing the focus position.

Figure 26:
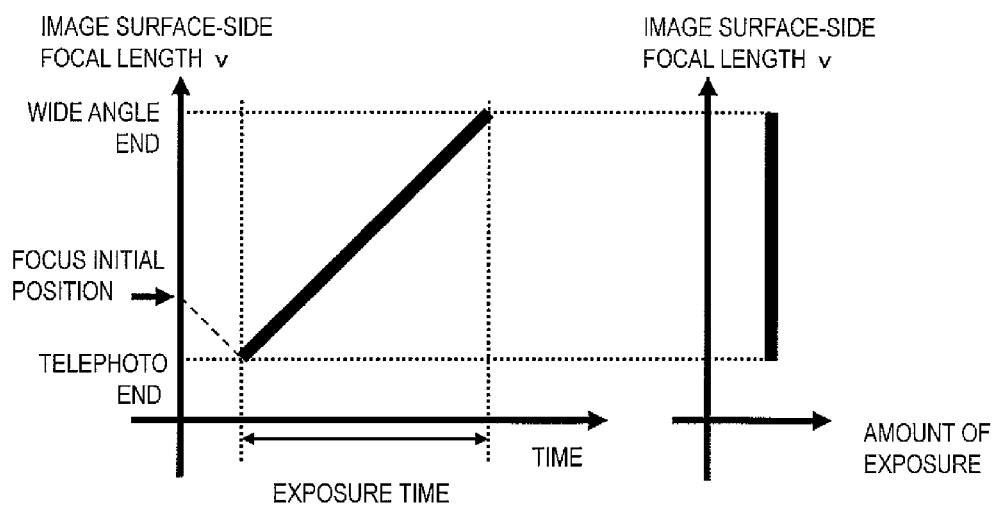
FIG. 26 is a diagram showing a focus lens displacement pattern by an F-DOF scheme.

FIG. 26 shows the change over time in the image surface-side focal length v (the same as v in FIG. 23) of the focus lens, and the change in the amount of exposure. When a release receiving section 113 receives an exposure starting command from the user, a focus lens position detection section 102 detects the position of the focus lens 101 at that point in time (the initial position). After the detection, the position of the focus lens 101 is displaced to a predetermined end position, e.g., the wide angle end or the telephoto end (the telephoto end in FIG. 25).

Simultaneously with the initialization of the focus lens 101, image capturing parameters such as the shutter speed and the aperture are determined by an exposure time determination section 114. Immediately after the completion of these operations, an exposure/focus lens displacement synchronizing section 121 for synchronizing the exposure and the focus lens displacement outputs an exposure starting command to a focus lens displacement control section 106 and a shutter opening/closing instruction section 112. Simultaneously, based on the end position of the focus lens 101 detected by the focus lens position detection section 102, a command is output to the focus lens displacement control section 106 for displacing the focus lens 101 at a uniform velocity within the exposure time from the telephoto end to the wide angle end if the end position is the telephoto end, or from the wide angle end to the telephoto end if the end position is the wide angle end.

On the light-receiving surface of the imaging device 104, the focus position being displaced at a uniform velocity means that the speed of change of the image surface-side focal length v is constant. With displacement at a uniform velocity, the amount of exposure during the displacement of the focus lens 101 is constant, irrespective of the position of the focus lens 101 as shown in FIG. 26. As shown in Expression 1 and FIG. 26, even though v is displaced at a uniform velocity, it does not mean that the object-side distance u between the object-side focal plane and the lens principal point is displaced at a uniform velocity. The horizontal axis of FIG. 26 represents the image surface-side focal length v, and it is in a reverse relationship with respect to the magnitude of the object distance u. That is, the image surface-side focal length v is shorter for objects whose object distance is longer (which are located farther away).

Immediately after receiving an exposure starting command from the exposure/focus lens displacement synchronizing section 121, the shutter opening/closing instruction section 112 performs a control to open a shutter 111. After passage of a predetermined exposure time, the exposure/focus lens displacement synchronizing section 121 outputs an exposure ending command to the shutter opening/closing instruction section 112. Immediately after receiving the exposure ending command, the shutter opening/closing instruction section 112 performs a control to close the shutter 111.

When an optical image of an object forms on the imaging device 104 through the procedure above, the formed optical image is converted to an electrical signal by the imaging device 104, and an image signal is output to an image processing section 109 via a read-out circuit 108. Simultaneously, the exposure/focus lens displacement synchronizing section 121 gives a notification to the image processing section 109 that the exposure has been ended and an image capturing operation with focus lens displacement by F-DOF has been performed. The image processing section 109 receives the image signal, performs necessary signal processes thereon, and outputs it to a recording section 110.

Figure 27:
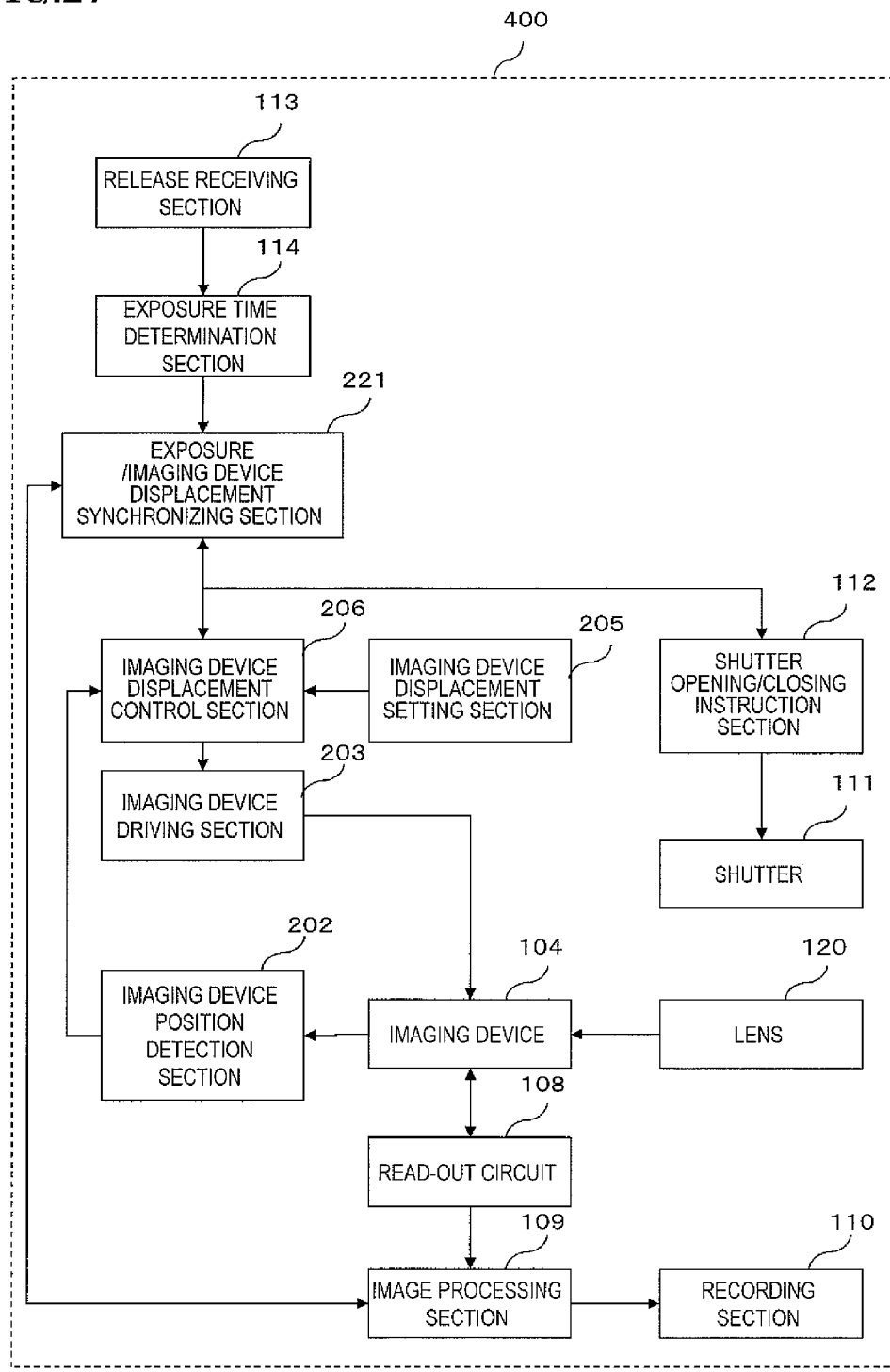
FIG. 27 is a block configuration diagram of another image capturing device examined by the present inventors.

An image capturing device 400 shown in FIG. 27 includes the imaging device 104, an imaging device position detection section 202, an exposure/imaging device displacement synchronizing section 207, an imaging device displacement control section 206, and an imaging device driving section 203, where the imaging device is displaced during the exposure time. As opposed to the image capturing device 300, the imaging device position detection section 202 detects the position of the imaging device 104. The exposure/imaging device displacement synchronizing section 207 synchronizes the exposure timing with the displacement of the imaging device 104. The imaging device displacement control section 206 controls the displacement of the imaging device 104. The imaging device driving section 203 receives a signal from the imaging device displacement control section 206 to drive the imaging device 104.

As the release receiving section 113 receives an exposure starting command from the user, the imaging device position detection section 202 detects the position of the imaging device 104 at that point in time (the initial position). After the detection, the position of the imaging device 104 is displaced to a predetermined end position, e.g., the wide angle end or the telephoto end. As described above, the wide angle end in the predetermined focus range refers to the position of the imaging device 104 when the imaging device 104 has been moved so that one of the objects included in the image capturing scene that is closest to the image capturing device 400 forms an image on the image capturing surface of the imaging device 104. Then, the distance u from the object to the focus lens 101 is shortest, and the distance v between the focus lens 101 and the imaging device 104 is longest. The telephoto end refers to the position of the imaging device 104 when the imaging device 104 has been moved so that one of the objects included in the image capturing scene that is farthest away from the image capturing device 400 forms an image on the image capturing surface of the imaging device 104. Then, the distance u from the object to the focus lens 101 is longest, and the distance v between the focus lens 101 and the imaging device 104 is shortest.

Simultaneously with the initialization of the imaging device 104, image capturing parameters such as the shutter speed and the aperture are determined by the exposure time determination section 114. Immediately after the completion of these operations, the exposure/imaging device displacement synchronizing section 207 for synchronizing the exposure and the imaging device displacement outputs an exposure starting command to the imaging device displacement control section 206 and the shutter opening/closing instruction section 112. Simultaneously, based on the end position of the imaging device 104 detected by the imaging device position detection section 202, a command is output to the imaging device displacement control section 206 for displacing the imaging device 104 within the exposure time from the telephoto end to the wide angle end if the end position is the telephoto end, or from the wide angle end to the telephoto end if the end position is the wide angle end. The imaging device 104 is displaced at a uniform velocity.

Immediately after receiving an exposure starting command from the exposure/imaging device displacement synchronizing section 207, the shutter opening/closing instruction section 112 performs a control to open the shutter 111. After passage of a predetermined exposure time, the exposure/imaging device displacement synchronizing section 207 outputs an exposure ending command to the shutter opening/closing instruction section 112. Immediately after receiving the exposure ending command, the shutter opening/closing instruction section 112 performs a control to close the shutter 111.

When an optical image of an object forms on the imaging device 104 through the procedure above, the formed optical image is converted to an electrical signal by the imaging device 104, and an electrical signal is output to the image processing section 109 via the read-out circuit 108. Simultaneously, the exposure/imaging device displacement synchronizing section 207 gives a notification to the image processing section 109 that the exposure has been ended and an image capturing operation with focus lens displacement by F-DOF has been performed. Otherwise, the same operation is performed as that of the image capturing device 300 shown in FIG. 25.

Figure 28:
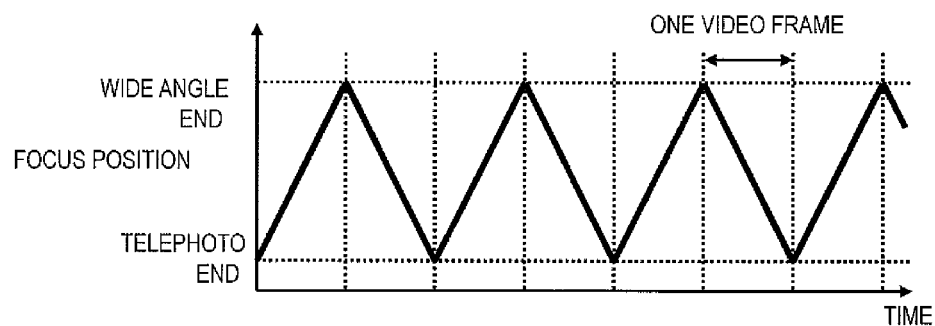
FIG. 28 is a diagram showing a focus lens displacement pattern by an F-DOF scheme.

While an image capturing operation of the F-DOF scheme in a digital still camera/digital video camera can be realized with such a configuration, when capturing a video, it is preferred to continuously capture images without causing a time lag between individual frame images of the video. Therefore, during a video-capturing operation, the position of the focus lens is reciprocally displaced between the telephoto end and the wide angle end, and a video frame period is assigned to each of the first, outward displacement and the second, returning displacement, as shown in FIG. 28, thus making it possible to capture a smooth EDOF video.

It is possible to obtain three-dimensional information of the image capturing scene if depth information of the image capturing scene, i.e., depth information representing whether each object included in the image capturing scene is in front of/behind other objects, is available in addition to an all-in-focus image obtained as described above. Various schemes have been proposed for the image capturing scene depth measurement technique. They can be generally classified into active methods of outputting infrared radiation, ultrasonic wave, laser light, or the like, and calculating the distance based on the amount of time taken for the reflected wave to return, the angle of the reflected wave, etc., and passive methods of calculating the distance based on object images. Particularly, with cameras, passive methods have been widely used, which do not require a device for outputting infrared radiation, or the like.

While many methods have been proposed as passive methods, one of them is a method called "depth from defocus" (hereinafter referred to as "DFD") for measuring the distance based on the blur caused by changes in focus. With this method, it is possible to measure the distance from a small number of images without requiring a plurality of cameras.

As a method for realizing DFD, a scheme called "half sweep" using F-DOF described above has been proposed (Non-Patent Document No. 2). In this scheme, the range of focus sweep in F-DOF is divided in two at the middle focus position between the far-side focus end position (telephoto end) and the near-side focus end position (wide angle end), and the depth is estimated using two images obtained by sweeping each range. It is possible to produce an all-in-focus image by using the two images simultaneously. For the purpose of distinction, the scheme described above of sweeping the entire section from the far-side focus end position to the near-side focus end position will be referred to as "full sweep".

Figure 29:
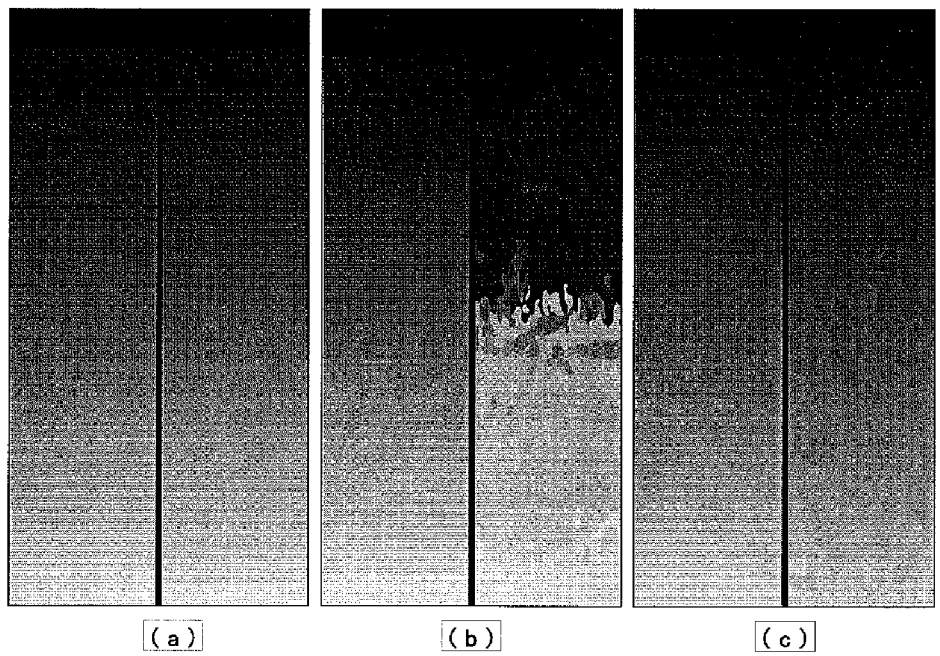
FIGS. 29(a) to 29(c) are diagrams showing measurement results obtained by a depth measurement method.
Figure 30:
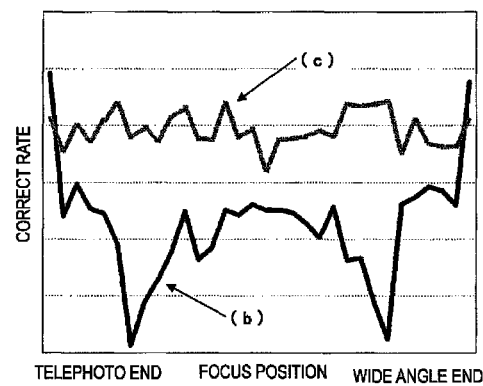
FIG. 30 is another diagram showing the results of FIGS. 29(a) to 29(c).

FIGS. 29 and 30 show examples of the results of estimating the depth by DFD disclosed in Non-Patent Document No. 2. The left half of each of the diagrams of FIGS. 29(a), 29(b) and 29(c) shows the results of estimating the depth, i.e., the distance from the image capturing device, obtained using an image having a texture containing a large amount of edge that is suitable for depth estimation, and the right half shows those obtained using an image having a texture containing a small amount of edge that is unsuitable for depth estimation. In these diagrams, the lower end and the upper end correspond to the near side and the far side in the depth direction, respectively. The shade of hatching in these diagrams represents the value of estimated distance, where a darker shade of hatching indicates a longer distance estimated.

FIG. 29(a) shows correct values of depth. That is, if the depth is estimated correctly, upper portions of the diagram are denoted by darker hatching and lower portions by lighter hatching. FIG. 29(b) shows the results of depth estimation obtained by a common DFD scheme (full-sweep scheme), and FIG. 29(c) shows the results of depth estimation obtained by a half-sweep scheme. In FIGS. 29(b) and 29(c), there are portions of dark hatching other than the upper portions. This indicates that the estimated distance is not correct. Comparison between FIGS. 29(b) and 29(c) shows that the depth estimation by the half-sweep scheme is superior to the full-sweep scheme particularly with the image of weak texture of the right half.

FIG. 30 shows the numerical representation of the results shown in FIGS. 29(b) and 29(c). The horizontal axis represents the depth, and the upper end of FIG. 29 corresponds to the left end of the horizontal axis. The vertical axis represents the correct rate for the depth estimations of FIGS. 29(b) and 29(c), with respect to the correct values shown in FIG. 29(a). The correct rate is the numerical representation by which the areas of strong and weak textures (the left half and the right half of the image) are taken together into a single value. It can be seen from FIG. 30 that the depth estimation obtained by the half-sweep scheme is superior.

Thus, where EDOF is employed for a digital still camera or a digital video camera, it is preferred to use the F-DOF scheme. As described above, when capturing a video, it is preferred to continuously capture images without causing a time lag between individual frames. As a method for realizing this, the position of the focus lens is reciprocally displaced between the telephoto end and the wide angle end during a video-capturing operation, and a video frame period is assigned to each of the first, outward displacement and the second, returning displacement, as shown in FIG. 31(a), thus making it possible to capture a smooth EDOF video. By stopping to obtain an image at each of the telephoto end and the wide angle end, the depth estimation by DFD can be realized with a movie.

On the other hand, when the F-DOF scheme using half sweep is employed, the area to be swept by the focus lens is divided in two at the middle position between the wide angle end position and the telephoto end position as shown in FIG. 31(b). Specifically, by reciprocally displacing the focus lens alternately between the telephoto end and the wide angle end in accordance with displacement patterns denoted as the near sweep NS and the far sweep FS, it is possible to similarly obtain EDOF images by all-in-focus images and estimate the depth continuously, thus making it possible to capture an EDOF video.

However, with the half-sweep scheme shown in FIG. 31(b), the displacement pattern for obtaining an all-in-focus image, i.e., the displacement pattern AS from the telephoto end to the wide angle end, is formed by a portion of the near sweep NS and a portion of the far sweep FS, and the displacement pattern AS spans over two video frames. Therefore, an all-in-focus image will be generated from two images shifted from each other in time. As a result, when an object is moving, an unnatural all-in-focus image is obtained. Specifically, it has been found that a position shift occurs between the object position in the image obtained by the near sweep NS and the object position in the image obtained by the far sweep FS, thereby significantly deteriorating the image quality of the all-in-focus image.

In contrast, where an all-in-focus image is obtained by the full-sweep scheme as shown in FIG. 31(a), one sweep image is obtained over a period in which the focus lens moves between the telephoto end and the wide angle end. Therefore, a blur occurs due to the movement of the object, but it is a blur within a continuous length of time and it is a similar phenomenon to that with ordinary video cameras; therefore, it is less likely to cause awkwardness in the image. That is, it can be said that it is preferred to use the full-sweep scheme for obtaining an all-in-focus image.

However, as examined by the present inventors, the sweep operation of constantly driving the focus position leads to an increase in the power consumption of the device, and the full sweep, in particular, has twice the amount of sweep displacement than the half sweep, and accordingly has a significant influence.

In view of such a problem, the present inventors have arrived at a novel image capturing device, semiconductor integrated circuit, and image capturing method. One aspect of the present invention is outlined as follows.

An image capturing device in one aspect of the present invention includes: an imaging device including a plurality of photoelectric conversion elements arranged in two dimensions to form an image capturing surface, wherein the plurality of photoelectric conversion elements are exposed and the imaging device generates an image signal by reading out electrical signals from the plurality of photoelectric conversion elements; a lens optical system including a focus lens for collecting light toward the imaging device; a driving section for driving one of the imaging device and the focus lens so as to change a distance between the imaging device and the focus lens; a displacement control section configured to, by outputting a command to the driving section, control displacement of the imaging device or the focus lens to be driven based on a predetermined displacement pattern; a diaphragm having an aperture whose size can be changed and provided in the lens optical system; an aperture control section configured to control the size of the aperture of the diaphragm; a synchronizing section configured to control the displacement control section and the aperture control section based on exposure timing of the imaging device; and an image capturing parameter determining section for determining a duration of the exposure, the size of the diaphragm aperture, and the displacement pattern, wherein: the predetermined displacement pattern includes a first-type displacement pattern and a second-type displacement pattern by which the imaging device or the focus lens is displaced over different ranges between a first focus position of the focus lens or the imaging device at which focus is at a first object distance in an image capturing scene, and a second focus position of the focus lens or the imaging device at which focus is at a second object distance in the image capturing scene; in the predetermined displacement pattern, the first-type displacement pattern and the second-type displacement pattern are repeated alternately; and the aperture control section controls the diaphragm so as to have a first aperture and a second aperture having a different size from that of the first aperture in the first-type displacement pattern and the second-type displacement pattern based on timing from the synchronizing section.

The first-type displacement pattern may not be displaced from a middle position between the first focus position and the second focus position.

The first-type displacement pattern may be displaced over an entire section between a position closer to the second focus position than the first focus position and a position closer to the second focus position than the second focus position.

The second-type displacement pattern may include: a second F-type displacement pattern of which the displacement range is an entire section between the first focus position and a middle position between the first focus position and the second focus position; and a second N-type displacement pattern of which the displacement range is an entire section between the middle position and the second focus position.

The first-type displacement pattern may be sandwiched between the second F-type displacement pattern and the second N-type displacement pattern; and the second F-type displacement pattern and the second N-type displacement pattern may not be continuous with each other.

The first-type displacement pattern may be sandwiched between the second F-type displacement pattern and the second N-type displacement pattern; and the second F-type displacement pattern and the second N-type displacement pattern may be continuous with each other.

The first aperture may be smaller than the second aperture.

The image capturing parameter determining section may determine the size of the first aperture and the size of the second aperture in accordance with an amount of incident light on the imaging device.

If the amount of incident light is smaller than a threshold value, the image capturing parameter determining section may set the first aperture to a predetermined size, irrespective of a value of the amount of incident light.

The image capturing parameter determining section may determine the duration of the exposure and the first-type displacement pattern and the second-type displacement pattern in accordance with a ratio of an amount of incident light on the imaging device in the first-type displacement pattern and the second-type displacement pattern.

The image capturing device may further include a position detection section for detecting a position of the imaging device or the focus lens to be driven, wherein the displacement control section instructs the driving section of an amount of driving based on an output of the position detection section and the displacement pattern.

The image capturing device may further include a read-out circuit for reading out the image signal from the imaging device, wherein the synchronizing section controls the displacement control section and the read-out circuit based on exposure timing of the imaging device.

An all-in-focus image may be generated from an image signal obtained while the imaging device or the focus lens to be driven is displaced based on the first-type displacement pattern.

Depth information may be generated from an image signal obtained while the imaging device or the focus lens to be driven is displaced based on the second-type displacement pattern.

The imaging device may be a CCD image sensor.

The imaging device may be a CMOS image sensor.

The first-type displacement pattern, the second F-type displacement pattern and the second N-type displacement pattern may each be displaced reciprocally at least twice across an entire displacement range thereof.

An integrated circuit in one aspect of the present invention is an integrated circuit of an image capturing device including: an imaging device including a plurality of photoelectric conversion elements arranged in two dimensions to form an image capturing surface, wherein the plurality of photoelectric conversion elements are exposed and the imaging device generates an image signal by reading out electrical signals from the plurality of photoelectric conversion elements; a lens optical system including a focus lens for collecting light toward the imaging device; a driving section for driving one of the imaging device and the focus lens so as to change a distance between the imaging device and the focus lens; and a diaphragm having an aperture whose size can be changed and provided in the lens optical system, the integrated circuit including: a displacement control section configured to, by outputting a command to the driving section, control displacement of the imaging device or the focus lens to be driven based on a predetermined displacement pattern; an aperture control section configured to control the size of the aperture of the diaphragm; a synchronizing section configured to control the displacement control section and the aperture control section based on exposure timing of the imaging device; and an image capturing parameter determining section for determining a duration of the exposure, the size of the diaphragm aperture, and the displacement pattern, wherein: the predetermined displacement pattern includes a first-type displacement pattern and a second-type displacement pattern by which the imaging device or the focus lens is displaced over different ranges between a first focus position of the focus lens or the imaging device at which focus is at a first object distance in an image capturing scene, and a second focus position of the focus lens or the imaging device at which focus is at a second object distance in the image capturing scene; in the predetermined displacement pattern, the first-type displacement pattern and the second-type displacement pattern are repeated alternately; and the aperture control section controls the diaphragm so as to have a first aperture and a second aperture having a different size from that of the first aperture in the first-type displacement pattern and the second-type displacement pattern based on timing from the synchronizing section.

An image capturing method in one aspect of the present invention is image capturing method for forming an image of an image capturing scene by collecting light by a focus lens toward an imaging device, the imaging device including a plurality of photoelectric conversion elements arranged in two dimensions to form an image capturing surface, wherein the plurality of photoelectric conversion elements are exposed and the imaging device generates an image signal by reading out electrical signals from the plurality of photoelectric conversion elements, the image capturing method including: determining a first-type displacement pattern and a second-type displacement pattern by which the imaging device or the focus lens is displaced over different ranges between a first focus position of the focus lens or the imaging device at which focus is at a first object distance in an image capturing scene, and a second focus position of the focus lens or the imaging device at which focus is at a second object distance in the image capturing scene; and exposing the plurality of photoelectric conversion elements using a diaphragm having a first aperture and a second aperture whose size is different from that of the first aperture respectively in the first-type displacement pattern and the second-type displacement pattern while displacing the focus lens or the imaging device alternately and repeatedly by the first-type displacement pattern and the second-type displacement pattern.

Embodiments of the present invention will now be described with reference to the drawings. Like elements are denoted by like reference signs, and description thereof may be omitted.

Embodiment 1

The first embodiment of an image capturing device, an integrated circuit, and an image capturing method according to the present invention will now be described with reference to the drawings.

Figure 1:
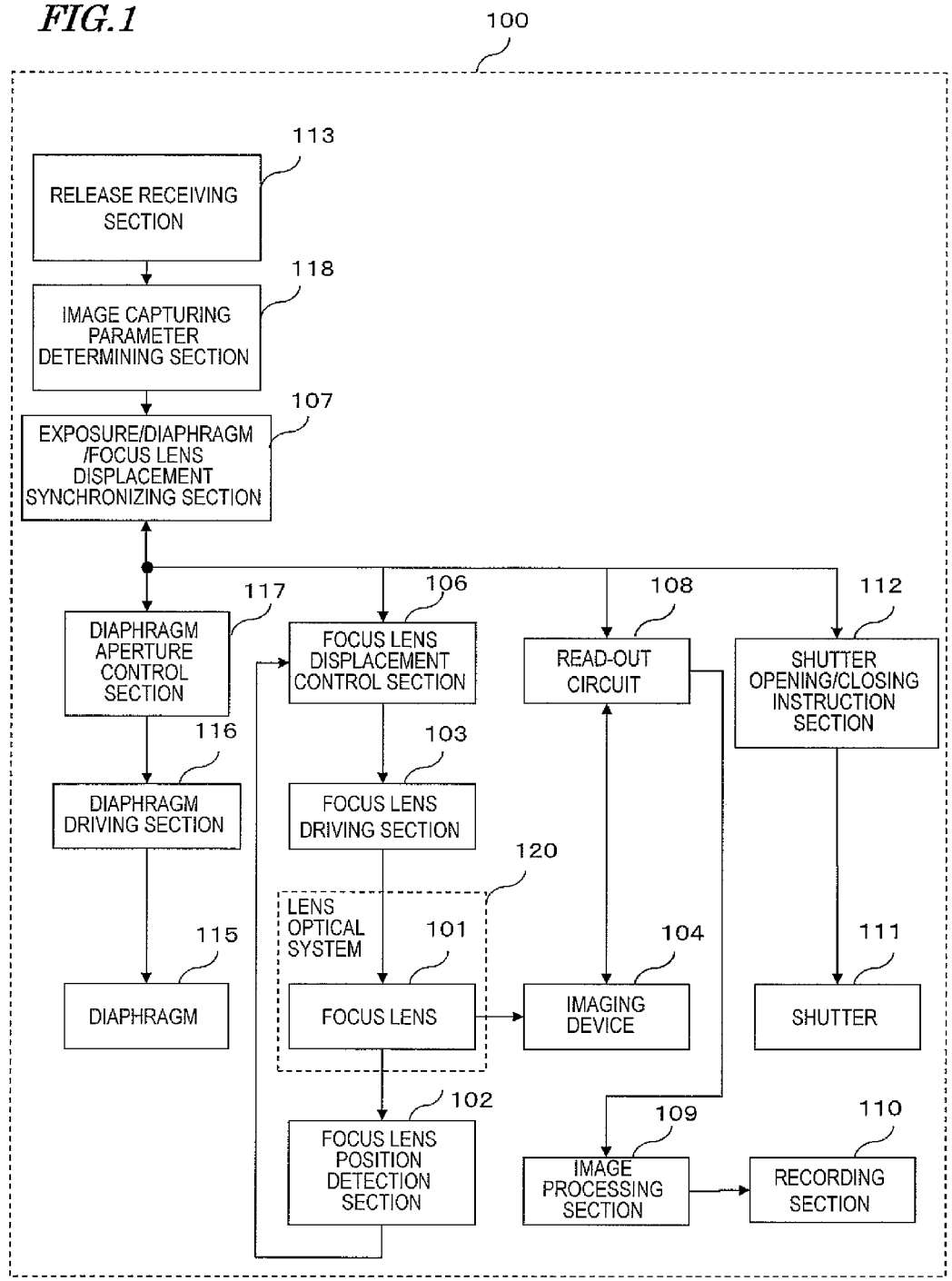
FIG. 1 is a block configuration diagram of an image capturing device of Embodiments 1, 2, 4 and 6.

FIG. 1 is a block configuration diagram showing an image capturing device 100 of the present embodiment. The image capturing device 100 includes the focus lens driving section 103, the imaging device 104, the focus lens displacement control section 106, an exposure/diaphragm/focus lens displacement synchronizing section 107, a diaphragm 115, a diaphragm aperture control section 117, an image capturing parameter determining section 118, and the lens optical system 120.

The imaging device 104 is a CCD image sensor in the present embodiment, and includes a plurality of photoelectric conversion elements arranged in two dimensions to form an image capturing surface. After the plurality of photoelectric conversion elements are exposed to light incident thereon, electrical signals are read out from the plurality of photoelectric conversion elements, thereby generating an image signal.

The lens optical system 120 includes the focus lens 101 for collecting incident light toward the imaging device 104 so as to form an image of the image capturing scene on the imaging device 104. The lens optical system 120 may include one or more lens other than the focus lens 101 in order to focus on an intended object in the image capturing scene. The focus lens 101 may also include a plurality of lenses. Where the focus lens 101 includes a plurality of lenses, the position of the focus lens refers to the position of the principal point of the plurality of lenses. In the present embodiment, the lens optical system 120 does not include the diaphragm 115.

In the present embodiment, the focus lens driving section 103 functions as a driving section for driving one of the imaging device 104 and the focus lens 101 so that the distance between the imaging device 104 and the focus lens 101 changes. That is, the focus lens driving section 103 drives the focus lens 101 based on a drive signal so that the distance between the imaging device 104 and the focus lens 101 changes.

The focus lens displacement control section 106 is configured to, by outputting a command to the focus lens driving section 103, control the displacement of the focus lens 101 based on a predetermined displacement pattern, as will be described below.

The diaphragm 115 has a predetermined aperture, and the size of the aperture can be changed based on the drive signal. The diaphragm 115 is provided in the lens optical system 120 or between the lens optical system 120 and the imaging device 104, for example, and it is possible, by changing the size of the aperture thereof, to adjust the depth of field in the image of the image capturing scene to be formed on the image capturing surface of the imaging device. In the present embodiment, the diaphragm 115 includes a plurality of diaphragm blades, and the size of the aperture is adjusted by driving the diaphragm blades for different degrees of overlap between the diaphragm blades. Therefore, the image capturing device 100 includes a diaphragm driving section 116 for driving the diaphragm blades of the diaphragm 115, and the diaphragm blades are driven by a drive signal. However, a diaphragm including the diaphragm driving section 116 may be used.

The diaphragm aperture control section 117 outputs a drive command for controlling the size of the aperture of the diaphragm 115.

The image capturing parameter determining section 118 determines the duration of the exposure of the imaging device 104, the size of the aperture of the diaphragm 115, and the displacement pattern of the focus lens 101, from image capturing parameters such as the brightness of the image capturing scene, the shutter speed and the aperture, as will be later described in detail.

The exposure/diaphragm/focus lens displacement synchronizing section 107 is configured to receive signals representing the duration of the exposure of the imaging device 104, the size of the aperture of the diaphragm 115 and the displacement pattern of the focus lens 101 from the image capturing parameter determining section 118, and to output these signals to the diaphragm aperture control section 117, the focus lens displacement control section 106 and the shutter opening/closing instruction section 112 and control the focus lens displacement control section 106 and the diaphragm aperture control section 117 based on the exposure timing of the imaging device 104.

The image capturing device 100 further includes the focus lens position detection section 102, the read-out circuit 108, the image processing section 109, the recording section 110, the shutter 111, the shutter opening/closing instruction section 112, and the release receiving section 113.

The focus lens position detection section 102 includes a position sensor, and detects the position of the focus lens 101 and outputs the detection signal to the focus lens displacement control section 106. The image capturing parameter determining section 118 sets the displacement pattern of the focus lens 101, and uses it as the target focus lens position. Therefore, the focus lens displacement control section 106 calculates a drive signal from the difference between the target focus lens position and the current position of the focus lens 101 detected by the focus lens position detection section 102, and outputs the drive signal to the focus lens driving section 103.

The release receiving section 113 receives an image capturing starting command from the user, and outputs a signal to the image capturing parameter determining section 118.

The shutter 111 opens/closes in accordance with the command from the shutter opening/closing instruction section 112. When the shutter 111 is open, the imaging device 104 is exposed to light collected by the focus lens 101, and the light to which the imaging device 104 is exposed is converted to an electrical signal to be output.

The read-out circuit 108 reads out an electrical signal by outputting a read-out signal to the imaging device 104, and outputs the readout electrical signal to the image processing section 109.

The image processing section 109 performs various corrections, etc., on the input electrical signal, and constructs an image signal forming an image of the image capturing scene of one video frame, one after another, and outputs the image signal to the recording section 110. Three-dimensional information of the image capturing scene may be obtained as will be described below.

Thus, the image capturing device 100 can obtain a sweep image by exposing the imaging device 104 while changing the position of the focus lens by driving the focus lens 101. Of the components of the image capturing device 100 described above, the focus lens position detection section 102, the focus lens driving section 103, the imaging device 104, the image processing section 109, the recording section 110, the release receiving section 113, the diaphragm 115, and the diaphragm driving section 116 may be implemented by known hardware. Some or all of the image capturing parameter determining section 118, the focus lens displacement control section 106, the exposure/diaphragm/focus lens displacement synchronizing section 107, the diaphragm aperture control section 117, the image capturing parameter determining section 118, the read-out circuit 108, the image processing section 109, the recording section 110, and the shutter opening/closing instruction section 112 may be implemented by an information processing circuit such as a CPU and software stored in a storage section such as a memory. In such a case, the information processing circuit reads out software defining the procedure of the image capturing method to be described below from the memory, and executes the procedure of the image capturing method, thereby controlling the components of the image capturing device 100. Some of the components realized by the information processing circuit and the software stored in the memory may be implemented by dedicated integrated circuits. For example, the image capturing parameter determining section 118, the focus lens displacement control section 106, the exposure/diaphragm/focus lens displacement synchronizing section 107, the diaphragm aperture control section 117, the image capturing parameter determining section 118, the shutter opening/closing instruction section 112 may be an integrated circuit.

Figure 2:
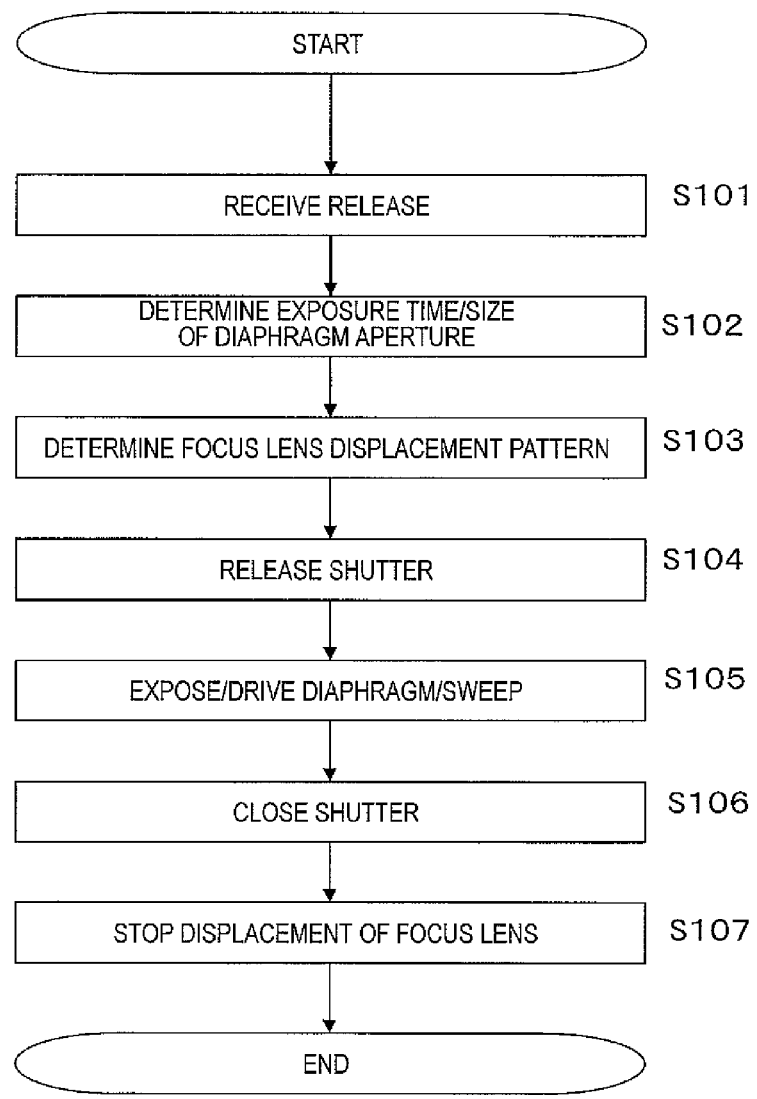
FIG. 2 is a flow chart showing an image capturing method of Embodiments 1, 2 and 4.

Next, referring to FIG. 1 and other figures, an image capturing method of the present embodiment will be described. FIG. 2 is a flow chart showing the outline of the image capturing method of the present embodiment. First, upon receiving a release operation by the user (S101), the image capturing parameter determining section 118 determines exposure parameters from image capturing parameters such as the brightness of the image capturing scene, the shutter speed and the aperture (S102). The exposure parameters include the exposure time and the size of the aperture of the diaphragm 115. The size of the aperture of the diaphragm 115 includes a first aperture and a second aperture which are different in size from each other. The focus lens displacement pattern is determined from the exposure time and the size of the aperture of the diaphragm 115 which have been determined (S103). The displacement pattern includes a first-type displacement pattern and a second-type displacement pattern. The first-type displacement pattern and the second-type displacement pattern are used when the diaphragm 115 has the first aperture and the second aperture, respectively. The displacement pattern will now be described in detail.

After determining the displacement pattern of the position of the focus lens 101, the exposure/diaphragm/focus lens displacement synchronizing section 107 outputs a command to the shutter opening/closing instruction section 112, the focus lens displacement setting section 105, the diaphragm aperture control section 117 and the read-out circuit 108 so that a focus lens displacement setting section 105, the diaphragm aperture control section 117 and the read-out circuit 108 operate based on the exposure timing of the imaging device 104. Thus, the shutter opening/closing instruction section 112 releases the shutter 111 (S104), and the diaphragm aperture control section 117 performs a control so that the diaphragm 115 has the first aperture or the second aperture depending on the type of the displacement pattern. The exposure of the imaging device 104 is started, and in synchronism with the start of the exposure, the focus lens driving section 103 displaces the focus lens 101 by a command from the focus lens displacement control section 106 (S105). Synchronism as used herein includes being simultaneous and having a predetermined delay period in-between. At a predetermined point in time in synchronism with the displacement of the focus lens 101, electrical signals forming an image of the image capturing scene are output from the imaging device 104 to the read-out circuit 108.

Upon completion of the image capturing operation, the shutter 111 is closed (S106), and the displacement of the focus position is stopped (S107), thereby completing the image capturing operation. In the case of a video-capturing operation, the exposure/sweep operation may be continued until a recording stop process command is input by the user. Thus, it is possible to continuously obtain sweep images and perform a video-capturing operation.

Next, referring to FIGS. 3 and 4, the details of the exposure/sweep operation will be described.

Figure 3:
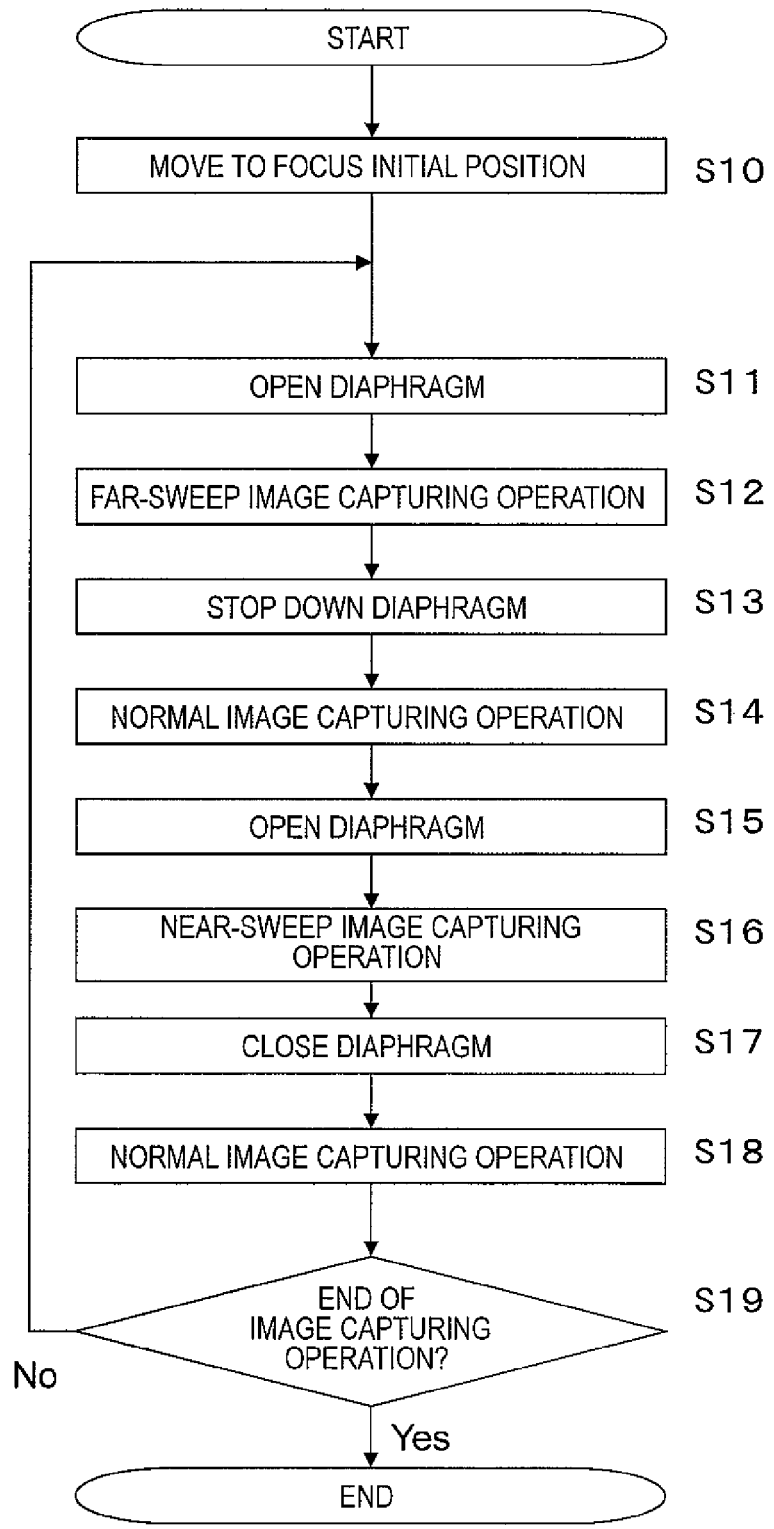
FIG. 3 is a flow chart illustrating an exposure/sweep step in FIG. 2 in greater detail.
Figure 4:
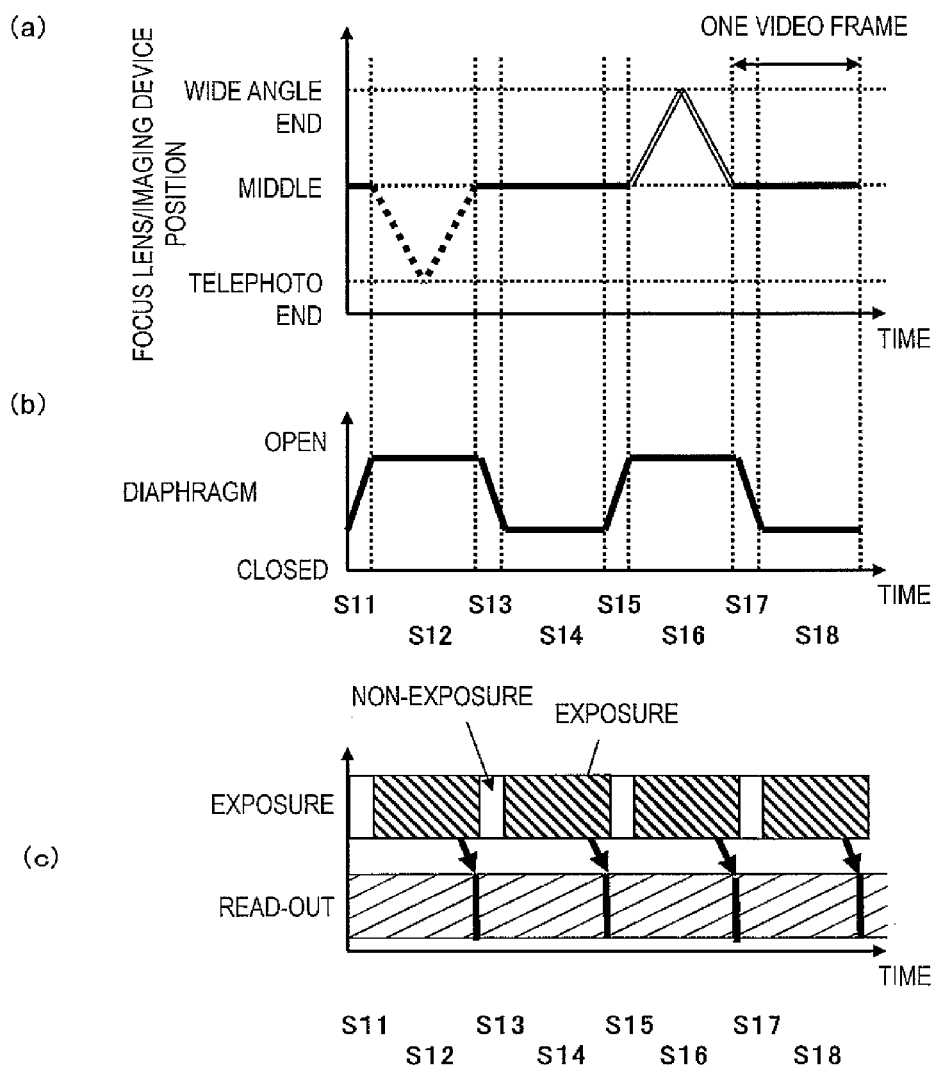
FIGS. 4(a), 4(b) and 4(c) show the exposure sweep pattern, the change over time in the aperture of the diaphragm, and the exposure and read-out timing of the imaging device of Embodiments 1 and 3.

FIG. 3 is a flow chart showing the procedure of a sweep operation in an image capturing operation. FIG. 4(a) is a diagram showing the change in the position of the focus lens, i.e., the sweep pattern (displacement pattern), when the position of the focus lens is displaced between the telephoto end and the wide angle end. The horizontal axis represents the time, and the vertical axis represents the position of the focus lens (the distance from the imaging device). The displacement pattern is a pattern representing the change over time in the position of the focus lens. In FIG. 4(a), the solid line represents a displacement pattern where the lens is not displaced and the focus position is held still (the first-type displacement pattern), and the double line and the dotted line represent a half-sweep displacement pattern (the second-type displacement pattern). More specifically, the double line represents a near-sweep displacement pattern (the second N-type displacement pattern), and the dotted line represents a far-sweep displacement pattern (the second F-type displacement pattern).

The near-sweep displacement pattern uses a displacement range extending across the entire section between the wide angle end and the middle position between the wide angle end and the telephoto end, and the far-sweep displacement pattern uses a displacement range extending across the entire section between the telephoto end and the middle position. The displacement range of the near-sweep displacement pattern and the displacement range of the far-sweep displacement pattern have no overlap with each other, and are exclusive of each other. The middle position does not need to be the exact middle point between the wide angle end and the telephoto end.

As shown in FIG. 4(a), the displacement pattern in which the displacement of the focus position is stopped, the near-sweep displacement pattern, and the far-sweep displacement pattern each coincide with the period required for the imaging device 104 to obtain one image, i.e., one video frame period.

FIG. 4(b) is a diagram showing the change over time in the size of the aperture of the diaphragm, where the vertical axis represents the size of the aperture of the diaphragm, and the horizontal axis represents the time. The reference signs along the horizontal axis of FIG. 4(b) correspond to the step numbers of FIG. 3.

FIG. 4(c) is a diagram showing the exposure and read-out timing of the imaging device, where the horizontal axis represents the time. In FIGS. 4(a) to 4(c), the time along the horizontal axis is shared between the figures. The reference signs along the horizontal axis of FIG. 4(c) correspond to the step numbers of FIG. 3.

Note that where in an image capturing scene including objects present at various distances from the image capturing device, the focus lens 101 is moved so that various objects present in a predetermined distance range are focused on the image capturing surface of the imaging device 104, the telephoto end and the wide angle end refer to the position of the focus lens 101 when an object closest to the image capturing device forms an image and that when an object farthest away from the image capturing device, as described above. An object that forms an image at the telephoto end (the first focus position) is located at the longest distance (the first object distance) from the image capturing device in the predetermined distance range, and an object that forms an image at the wide angle end (the second focus position) is located at the shortest distance (the second object distance) from the image capturing device in the predetermined distance range.

As shown in FIGS. 3 and 4(a), first, the focus lens driving section 103 moves the focus lens 101 to the middle position, which is the initial position, based on a command from the focus lens displacement control section 106 (S10). Then, the diaphragm aperture control section 117 fully opens the diaphragm 115 (S11). In this process, the focus position is not changed but is held still at the initial position. Then, the position of the focus lens 101 is displaced from the middle position according to the far-sweep displacement pattern between the telephoto end and the middle position so as to move from the middle position to the telephoto end and then back to the middle position again (S12). That is, the focus lens 101 is moved in a half-sweep motion according to the far-sweep displacement pattern. At the same time, the electronic shutter of the imaging device 104 is controlled to start exposing the imaging device 104. In the present embodiment, since the imaging device 104 is a CCD image sensor, all photoelectric conversion elements (all pixels) start to be exposed at the same time by a global shutter operation.

Then, the focus lens is stopped, and the exposure of the imaging device 104 is also stopped by the electronic shutter. The imaging device 104 reads out, from each photoelectric conversion element, an electrical signal (electric charge) in accordance with the amount of light of the exposure. This is done simultaneously for all photoelectric conversion elements by a global shutter operation, as indicated by a bold line in FIG. 4(c). Note however that the readout electrical signals are successively transferred by CCDs.

Then, the diaphragm aperture control section 117 stops down the diaphragm 115 to a predetermined size of the aperture (S13), and a normal image capturing operation is performed while the focus position is fixed (S14). At the same time, the electronic shutter of the imaging device 104 is controlled to start exposing the imaging device 104.

After the diaphragm aperture control section 117 fully opens the diaphragm again (S15), the focus lens driving section 103 displaces the position of the focus lens 101 from the middle position according to the near-sweep displacement pattern between the wide angle end and the middle position so as to move from the middle position to the wide angle end and then back to the middle position again (S16). That is, the focus lens 101 is moved in a half-sweep motion according to the near-sweep displacement pattern.

Then, the focus lens 101 is stopped again, and the exposure of the imaging device 104 is also stopped by the electronic shutter, reading out an electrical signal (electric charge) from each photoelectric conversion element. Moreover, the aperture of the diaphragm 115 is stopped down to a predetermined amount (S17), and an image capturing operation is performed while the focus position is fixed (S18).

The operation from S11 to S18 described above is one cycle of the image capturing operation. As can be seen from FIG. 4(a), in the present embodiment, in the displacement pattern for a one-cycle operation, the displacement pattern (the first-type displacement pattern) in which the focus position is held still is sandwiched between the near-sweep displacement pattern (the second N-type displacement pattern) and the far-sweep displacement pattern (the second F-type displacement pattern), and the near-sweep displacement pattern and the far-sweep displacement pattern are not continuous with each other. When capturing a video, the operation from S11 to S18 may be continued repeatedly. As shown in FIG. 4(c), the exposure is stopped by the electronic shutter while the size of the aperture of the diaphragm 115 is changed (S11, S13, S15, S17).

When the end of an image capturing operation is instructed, confirming a user input instructing the end of an image capturing operation (S19), the sweep operation is ended.

Next, a method for obtaining three-dimensional information from the obtained sweep images will be described. For example, the image processing section 109 may be configured to obtain three-dimensional information of the image capturing scene. The image of the electrical signals obtained in steps S14 and S18 has been captured with a constant focus position and with the diaphragm stopped down. Thus, an image of a large depth of field, i.e., an all-in-focus image (a pseudo full-sweep image) in which objects within the range of the depth of field are all in focus.

On the other hand, the image of the electrical signals obtained in steps S12 and S16 has been captured convoluted while moving the focus position. Therefore, a near-sweep image and a far-sweep image by the half-sweep scheme are obtained. Therefore, depth information of the image capturing scene can be obtained by, for example, using the image processing method disclosed in Non-Patent Document No. 2 on the image obtained in steps S12 and S16.

Using the all-in-focus image and depth information, it is possible to obtain three-dimensional information in the image capturing scene. That is, it is possible to obtain three-dimensional information in one scene from a total of three images, i.e., one pseudo full-sweep image, and a far-sweep image and a near-sweep image captured at one frame therebefore and one frame thereafter. For example, it is possible to reconstruct an image in which an intended object between the telephoto end and the wide angle end of the image capturing scene is in focus. According to the present embodiment, an image by half sweep is used for the depth estimation. Since the depth estimation based on an image by half sweep has a higher precision than the depth estimation based on an image obtained by full sweep, as described above, three-dimensional information obtained in the present embodiment has a high precision.

According to the present embodiment, four images are captured in a one-cycle focus lens displacement pattern; however, since the frame of the all-in-focus image is sandwiched between the frames of images obtained by half sweep, the all-in-focus image and the three-dimensional information described above are obtained over two video frame cycles. Therefore, it is possible to obtain a smooth EDOF video according to the present embodiment. For example, using an imaging device capable of the image capturing operation at 60 fps, for example, it is possible to obtain a 30-fps three-dimensional video. Using an imaging device capable of an even faster image capturing operation, it is possible to realize an EDOF video that is smoother (with a higher frame rate).

According to the present embodiment, an all-in-focus image is obtained over a length that coincides with the period of one video frame, the entire all-in-focus image is obtained with timing that is matched in time, thereby obtaining natural all-in-focus images. Based on these, according to the present embodiment, it is possible to obtain a smooth EDOF video that has a high quality with no awkwardness.

Moreover, an all-in-focus image can be obtained while the focus lens is held still. Therefore, it is possible to reduce the power consumption of the image capturing device as a whole. Since the focus lens is not moved in a full sweep motion, a driving source such as a motor whose driving power is lower than that used in a case where the focus lens is moved in a full sweep can be used for driving the focus lens. Therefore, it is possible to reduce the manufacturing cost of the image capturing device, and to further reduce the size of the image capturing device. The image process for obtaining the depth information described above is susceptible to noise because the high-frequency region is emphasized in the calculation process, and the computational scale thereof is a cause for a further increase in the power consumption. Also in view of these, it is advantageous that the driving source for the focus lens has a low power consumption and does not require a high driving power.

Note that while the initial position of the focus lens is set to the telephoto end in the present embodiment, the initial position may be the wide angle end. When a still image is captured by the image capturing device 100 of the present embodiment, it only needs an all-in-focus image, and a near-sweep image and a far-sweep image continuous with the all-in-focus image. Therefore, the displacement pattern used in the present embodiment does not need to include the displacement pattern of step S18.

The three-dimensional information may be obtained by a signal processing section other than the image processing section 109, e.g., a computer or a signal processing section external to the image capturing device 100.

Embodiment 2

Figure 5:
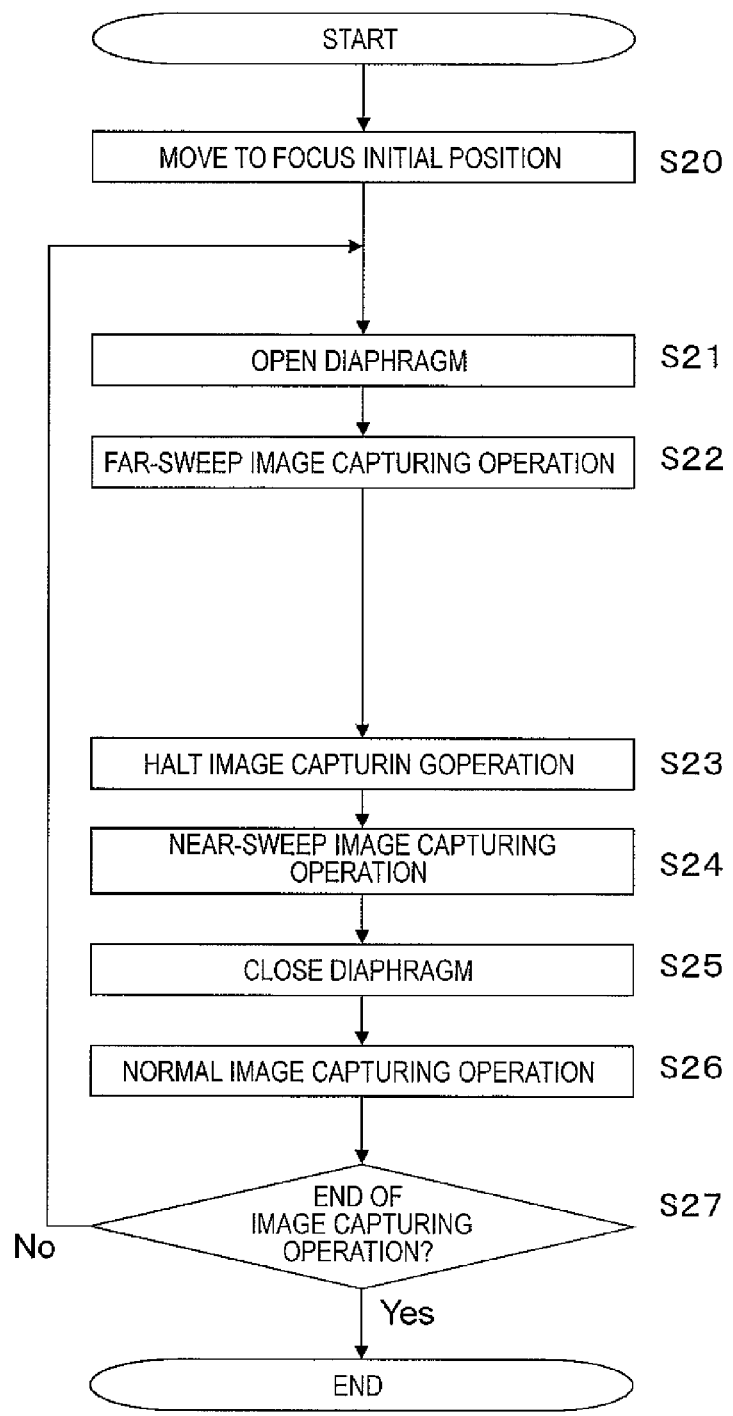
FIG. 5 is a flow chart illustrating the exposure/sweep step of Embodiments 2 and 3 in detail.
Figure 6:
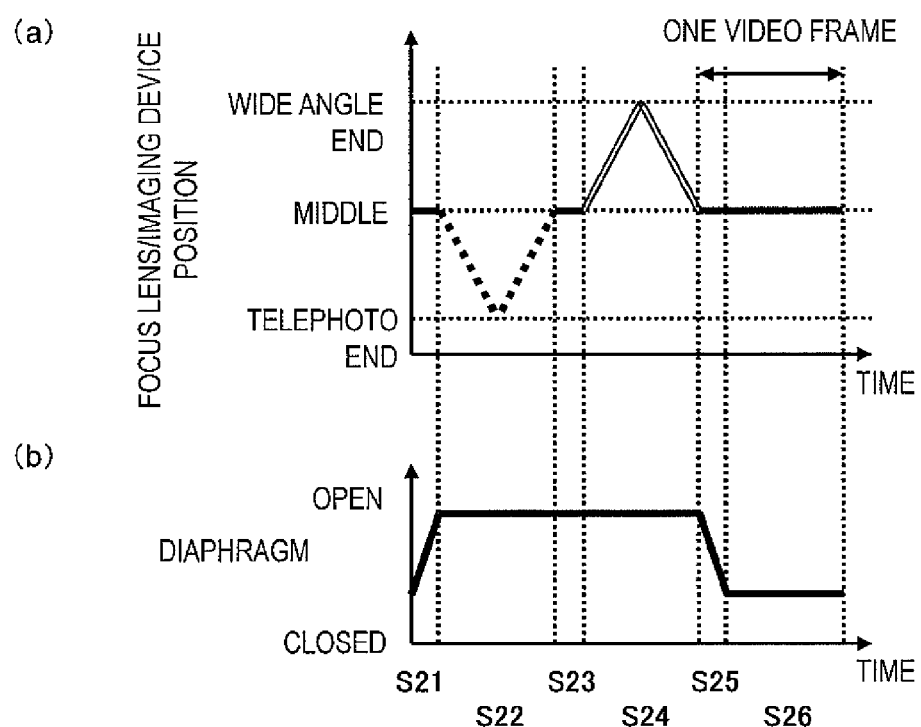
FIGS. 6(a) and 6(b) show the exposure sweep pattern and the change over time in the aperture of the diaphragm of Embodiments 2 and 3.

Referring to FIGS. 5 and 6, the second embodiment of an image capturing device, an integrated circuit and an image capturing method according to the present invention will be described.

The configuration of the image capturing device of the present embodiment is similar to the image capturing device of Embodiment 1, but uses a different focus lens displacement pattern.

FIG. 5 is a flow chart showing the procedure of a sweep operation in an image capturing operation. FIG. 6(a) is a diagram showing the sweep pattern of the focus lens when the position of the focus lens is displaced between the telephoto end and the wide angle end, and FIG. 6(b) is a diagram showing the change over time in the size of the aperture of the diaphragm.

In the present embodiment, after the focus position is moved to the initial position (S20), the diaphragm is fully opened (S21) and a far-sweep image capturing operation is performed (S22), after which the image capturing operation is stopped (halted) over the same amount of time as that required for fully opening the diaphragm in step S21 (S23), and then a near-sweep image capturing operation is performed (S24). Then, the aperture of the diaphragm is stopped down to a predetermined size (S25), and an image capturing operation is performed while the focus position is fixed (S26).

Thus, in the focus lens displacement pattern of the present embodiment, in the displacement pattern for a one-cycle operation, the displacement pattern (the first-type displacement pattern) in which the focus position is held still is sandwiched between the near-sweep displacement pattern (the second N-type displacement pattern) and the far-sweep displacement pattern (the second F-type displacement pattern), and the near-sweep displacement pattern and the far-sweep displacement pattern are continuous with each other.

The size of the aperture of the diaphragm during the near-sweep image capturing operation in step S24 may be the same as the size of the aperture set in step S22. Note however that in the process of obtaining depth information, it is possible to realize depth estimation with a higher precision when the image capturing parameters for a near-sweep image are equal to those for a far-sweep image. Therefore, the exposure is stopped over the period of time corresponding to step S21 so that the exposure time in step S22 is equal to that in step S24.

Also with the image capturing device of the present embodiment, as with the image capturing device of Embodiment 1, it is possible to shoot a three-dimensional video, and it is possible to obtain effects similar to those of the image capturing device of Embodiment 1.

Embodiment 3

Figure 7:
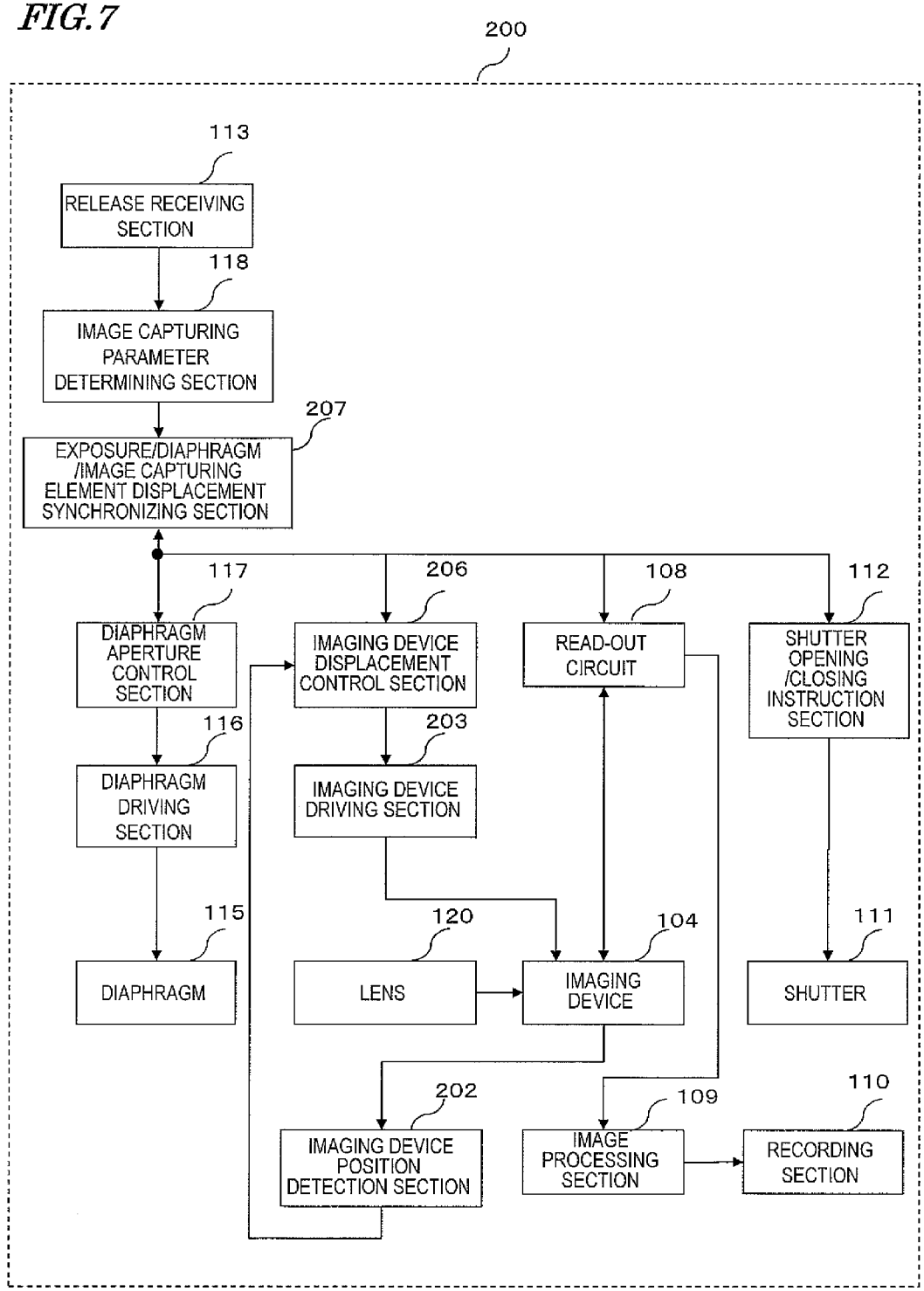
FIG. 7 is a block configuration diagram of an image capturing device of Embodiments 3, 4 and 6.
Figure 8:
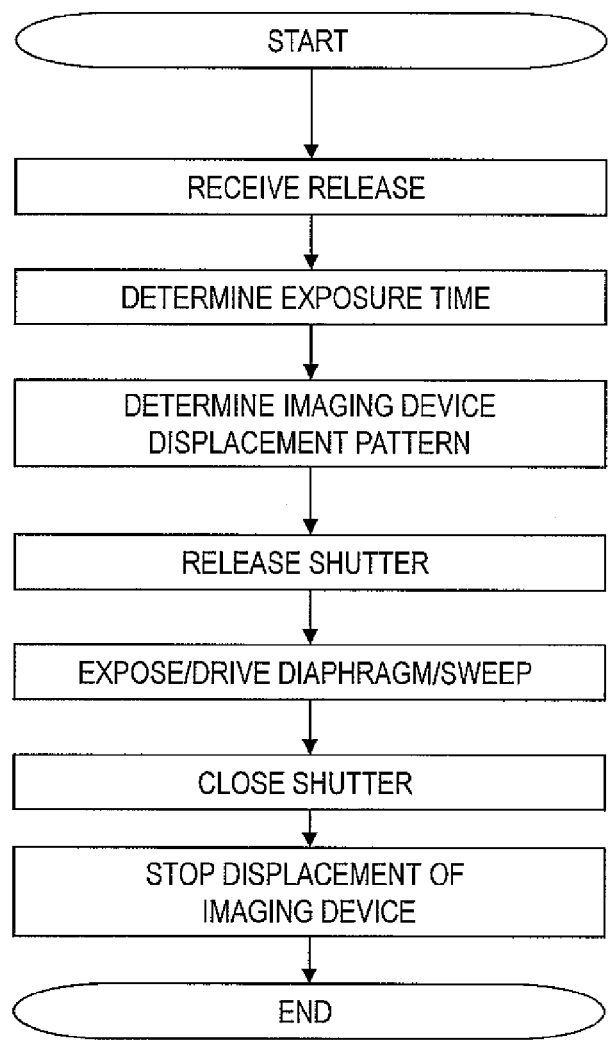
FIG. 8 is a flow chart showing an operation of Embodiments 3, 4 and 6.

Referring to FIGS. 7 and 8, an image capturing device, an integrated circuit and an image capturing method of Embodiment 3 will be described.

FIG. 7 is a block configuration diagram showing an image capturing device 200 of the present embodiment. The same components as those of the image capturing device 100 of Embodiment 1 are denoted by the same reference signs. The image capturing device 200 is different from the image capturing device 100 in that the distance from the lens optical system 120 to the focus lens 101 by moving the position of the imaging device 104.

For this, the image capturing device 200 includes the imaging device position detection section 202, the imaging device driving section 203, the imaging device displacement control section 206, and an exposure/diaphragm/imaging device displacement synchronizing section 207.

The imaging device position detection section 202 includes a position sensor to detect the position of the imaging device 104, and outputs the detection signal to the imaging device displacement control section 206. The image capturing parameter setting section 118 sets a displacement pattern of the imaging device 104, and uses it as the target imaging device position. Thus, the imaging device displacement control section 206 calculates a drive signal from the difference between the target imaging device position and the current position of the imaging device 104 detected by the imaging device position detection section 202, and outputs the drive signal to the imaging device driving section 203.

In the release receiving section 113, when an image capturing start command from the user is received, the image capturing parameter setting section 118 determines the exposure time of the imaging device 104, the size of the aperture of the diaphragm, and the displacement pattern, and outputs these information to the exposure/diaphragm/imaging device displacement synchronizing section 207.

Based on the information regarding the exposure time, the exposure/diaphragm/imaging device displacement synchronizing section 207 outputs commands to the shutter opening/closing instruction section 112, the diaphragm aperture control section 117, the imaging device displacement control section 206 and the read-out circuit 108 so as to perform, with synchronized timing, the exposure, the control of the aperture of the diaphragm 115, the driving of the imaging device 104, and the read-out of electrical signals from the imaging device 104. Thus, the image capturing device 200 can set the aperture of the diaphragm 115 to a predetermined size, and expose the imaging device 104 while changing the position of the imaging device 104 by driving the imaging device 104, thereby obtaining a sweep image.

FIG. 8 is a flow chart showing an image capturing method of the present embodiment. This is the same as the image capturing method of Embodiment 1 illustrated in FIG. 2, except that the imaging device is displaced in order to change the distance between the imaging device and the focus lens.

The displacement pattern of the imaging device is the same as the displacement pattern for the position of the focus lens described in Embodiment 1 and Embodiment 2. Displacement patterns for the position of the focus lens of Embodiment 4 to Embodiment 7 to be described below may also be used.

Also with the image capturing device of the present embodiment, as with the image capturing device of Embodiment 1, it is possible to shoot a three-dimensional video, and it is possible to obtain effects similar to those of the image capturing device of Embodiment 1.

Embodiment 4

The image capturing devices of Embodiment 1 to Embodiment 3 use a CCD image sensor as the imaging device. Since a CCD image sensor can be used with a global shutter operation capable of reading out all pixels simultaneously, the focus lens displacement patterns for the image capturing devices of these embodiments are suitable for a CCD image sensor. In the present embodiment, an image capturing device, an integrated circuit and an image capturing method will be described in which a CMOS image sensor is used as the imaging device.

An imaging device formed by a CMOS image sensor is suitable for reading out many pixels at a high speed, and an imaging device has been realized that is capable of reading out pixels of a full HD (1920×1080) size at 60 fps, for example.

When successively reading out the electric charge obtained by exposing an imaging device formed by a CMOS image sensor, an electronic shutter controlling scheme called "rolling shutter" is used in which electric charge is read out from each pixel by successively scanning an array of pixels arranged in two dimensions by the unit of rows, or the like.

FIG. 9(a) shows the timing for reading out electric charge from an array of pixels in such an imaging device. The horizontal axis represents the time, and the vertical axis represents the position of the read-out row of the imaging device. The imaging device is formed by a plurality (N) of pixel rows. The hatched portion of FIG. 9(a) represents the exposure timing of the imaging device when obtaining a single image, and the bold solid line represents the data read-out timing. As shown in FIG. 9(a), the process successively scans the imaging device starting from the top row to read out electric charge from the pixels, starts accumulating the electric charge immediately thereafter, and scans again after passage of a predetermined amount of time to read out electric charge from the pixels, thereby obtaining an image signal. It is possible to obtain a continuous moving image by repeating the scanning again from the top after completing the scanning of the $N^{th}$ row. As can be seen from FIG. 9(a), when an image capturing operation is performed by the rolling shutter, there occurs a lag in the image capturing timing across the surface of the imaging device, resulting in a lag of one video frame at maximum between the top row and the final row.

When obtaining an image by the F-DOF scheme, it is necessary to displace the focus state from the telephoto end to the wide angle end of a predetermined focus range so as to uniformly expose all the pixels within the surface of the imaging device. FIG. 9(b) corresponds to the horizontal axis of FIG. 9(a), and shows a displacement pattern where the focus lens is moved in a sweep operation from the telephoto end to the wide angle end in one video frame period by the rolling shutter. When the imaging device is exposed with timing shown in FIG. 9(a), the focus lens moves across the entire range from the telephoto end to the wide angle end over a period in which the first read-out row is exposed. However, over a period in which the $N^{th}$ row is exposed, the focus lens is located only at the wide angle end. Over a period in which rows therebetween are exposed, the focus lens is displaced only over a portion of the range from the telephoto end to the wide angle end. Therefore, if the focus lens is displaced by the displacement pattern shown in FIG. 9(b), it is not possible to obtain a correct sweep image.

FIG. 9(c) shows an example of a displacement pattern suitable for an imaging device formed by a CMOS image sensor. In the displacement pattern shown in FIG. 9(c), the displacement starts from the telephoto end and the position returns to the telephoto end after reaching the wide angle end over one video frame period; that is, the position is displaced so as to make one reciprocal movement between the telephoto end and the wide angle end over one video frame period. While the exposure time coincides with one video frame and therefore the reciprocal motion of the displacement pattern coincides with one video frame in this example, it is only required that the reciprocal motion be in synchronism with the exposure time. That is, a number of reciprocations that is a multiple of the exposure time by an integer of 2 or more may be made. With the displacement pattern shown in FIG. 9(c), it is possible to uniformly expose all the pixels across the surface of the imaging device as the displacement pattern lasts over a period of two video frames, i.e., as the sweep operation is performed for two reciprocations.

Figure 31:
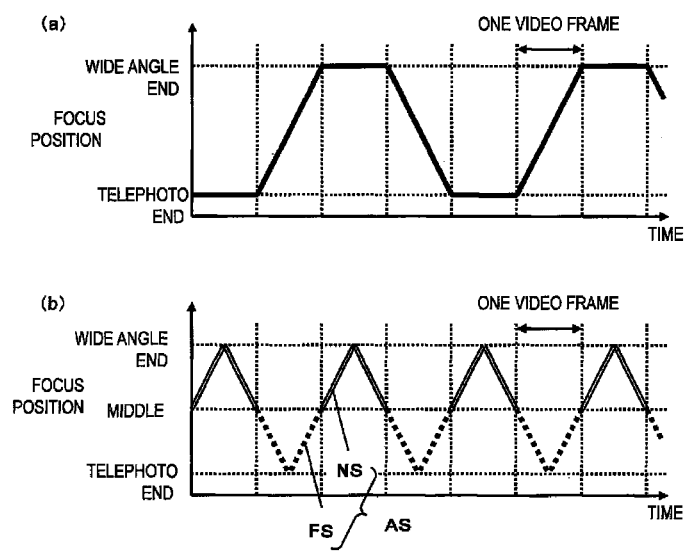
FIGS. 31(a) and 31(b) show examples of sweep patterns when capturing a video by an image capturing device using a full-sweep scheme and a half-sweep scheme.
Figure 32:
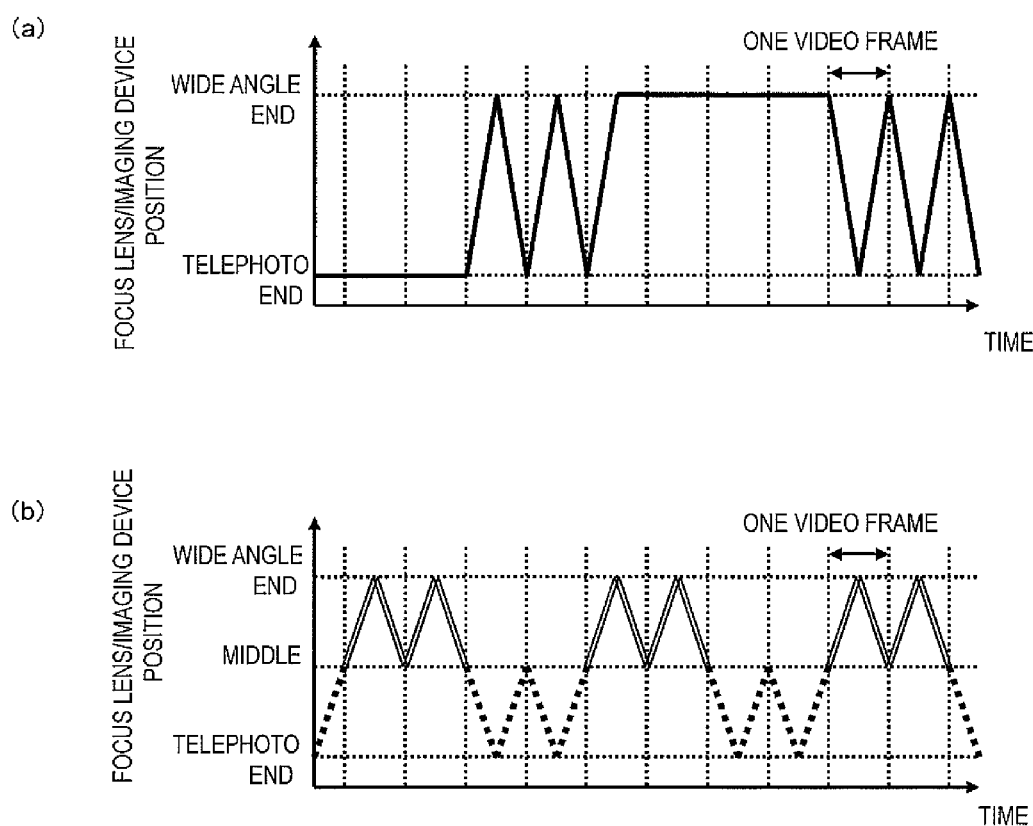
FIGS. 32(a) and 32(b) show examples of sweep patterns when capturing a video by an image capturing device using a full-sweep scheme and a half-sweep scheme where a CMOS image sensor is used.

Based on such a difference, the sweep operation shown in FIG. 31 can be realized by using a displacement pattern shown in FIG. 32 in a case where a CMOS image sensor is used as the imaging device.

In the full-sweep scheme shown in FIG. 32(a), the sweep operation for obtaining one sweep image may be done in two reciprocations. However, according to the DFD scheme, it is necessary to move the focus position from the wide angle end to the telephoto end. Therefore, it is necessary to include a displacement pattern for moving the focus lens from the telephoto end to the wide angle end or from the wide angle end to the telephoto end, without capturing an image, and it is different in this regard from a displacement pattern where a CCD image sensor is used as the imaging device. On the other hand, as shown in FIG. 32(b), according to the half-sweep scheme, since the sweep start position is the middle position between the wide angle end and the telephoto end both for the near sweep and the far sweep, and each sweep is one reciprocation in the first place, no focus movement occurs other than the reciprocal motion.

Figure 10:
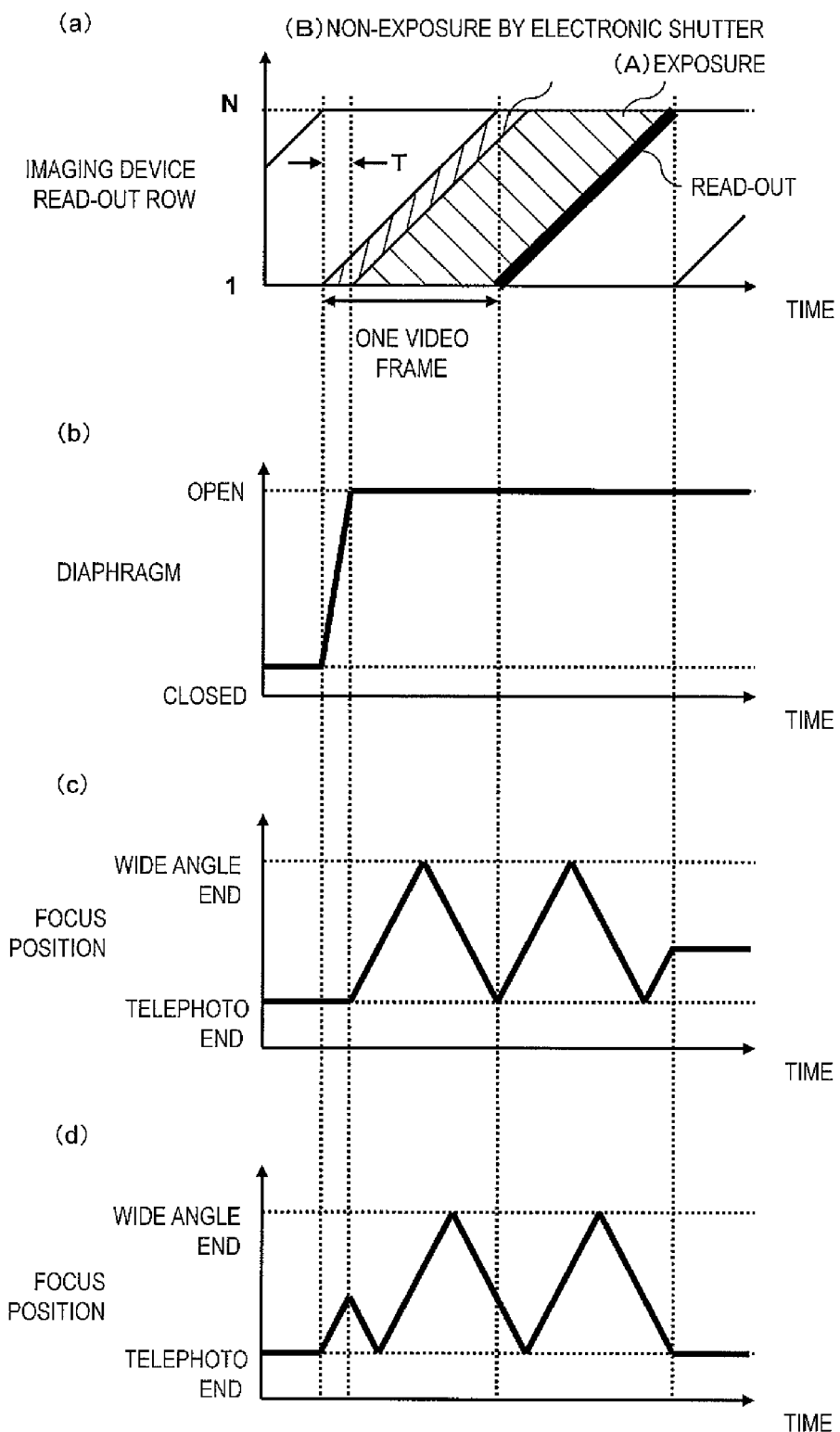
FIG. 10(a) is a diagram illustrating a rolling shutter operation of an imaging device formed by a CMOS image sensor where the exposure is restricted by an electronic shutter.
FIG. 10(b) shows the change over time in the aperture of the diaphragm.
FIGS. 10(c) and 10(d) are diagrams each showing an example of a focus lens displacement pattern.

As described above, where a CMOS image sensor is used, instead of a CCD image sensor, as the imaging device, the focus lens can be moved in two reciprocations over a period of two video frames. Note however that when the size of the aperture of the diaphragm is changed during an image capturing operation, it is necessary to limit the exposure using an electronic shutter so as not to capture an image while the size of the aperture is changed. The operation in such a case will be described with reference to FIG. 10.

Figure 9:
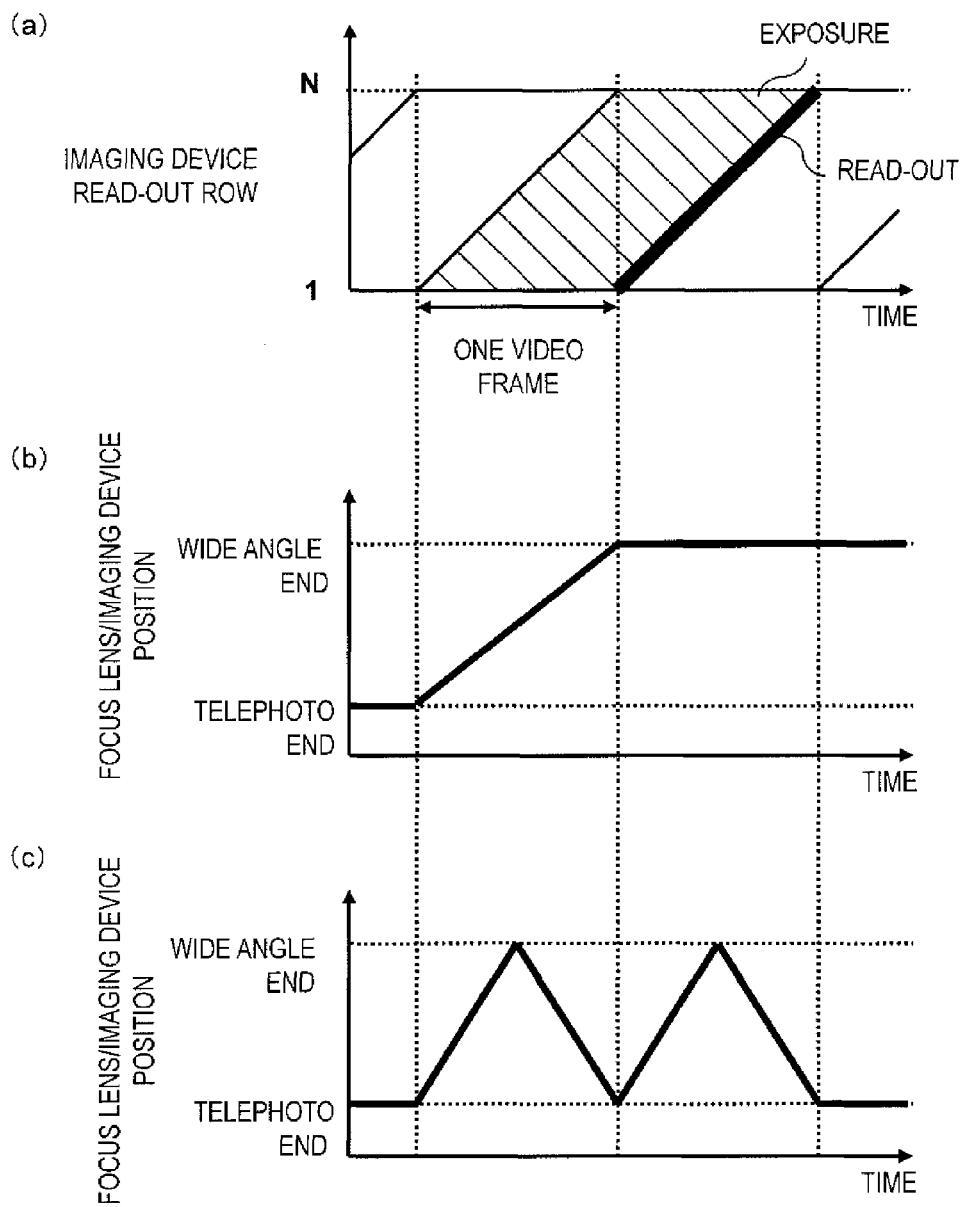
FIG. 9(a) is a diagram illustrating a rolling shutter operation of an imaging device formed by a CMOS image sensor.
FIGS. 9(b) and 9(c) are diagrams each showing an example of a focus lens displacement pattern.

In FIGS. 10(a), 10(c) and 10(d), the vertical axis and the horizontal axis are the same as those of FIGS. 9(a), 9(b) and 9(c). For the exposure where an imaging device formed by a CMOS image sensor is used with an electronic shutter, the exposure is done over a period of time that is shorter by a period T for each read-out row of the imaging device as shown in FIG. 10(a). Therefore, in FIG. 10(a), there are an exposure area (A) and a non-exposure area (B). The diaphragm is controlled so that the change of the size of the aperture is completed during a period T from the start of each video frame, as shown in FIG. 10(b). As shown in FIG. 10(c), for each read-out row, a sweep operation is performed such that the sweep operation starts upon completion of the non-exposure time by the electronic shutter and one reciprocation is made over the exposure time for the read-out row. The exposure time for each read-out row is made shorter than one video frame by the electronic shutter. Therefore, the sweep operation lasts over more than two reciprocations, which is the difference from the case with no electronic shutter illustrated in FIG. 9. Taking into consideration that a continuous sweep operation is performed, a sweep operation may be performed such that a preliminary sweep operation is performed over the period T as shown in FIG. 10(d) and such that the focus position returns to the initial position upon completion of the video frame.

By using such an electronic shutter operation, it is possible to realize the image capturing devices of Embodiments 1 and 2 using a CMOS image sensor. The image capturing device of the present embodiment has the same configuration as those of the image capturing devices of Embodiments 1 and 2 except that the imaging device is a CMOS image sensor, and therefore the description of the components of the image capturing device will not be repeated herein.

Figure 11:
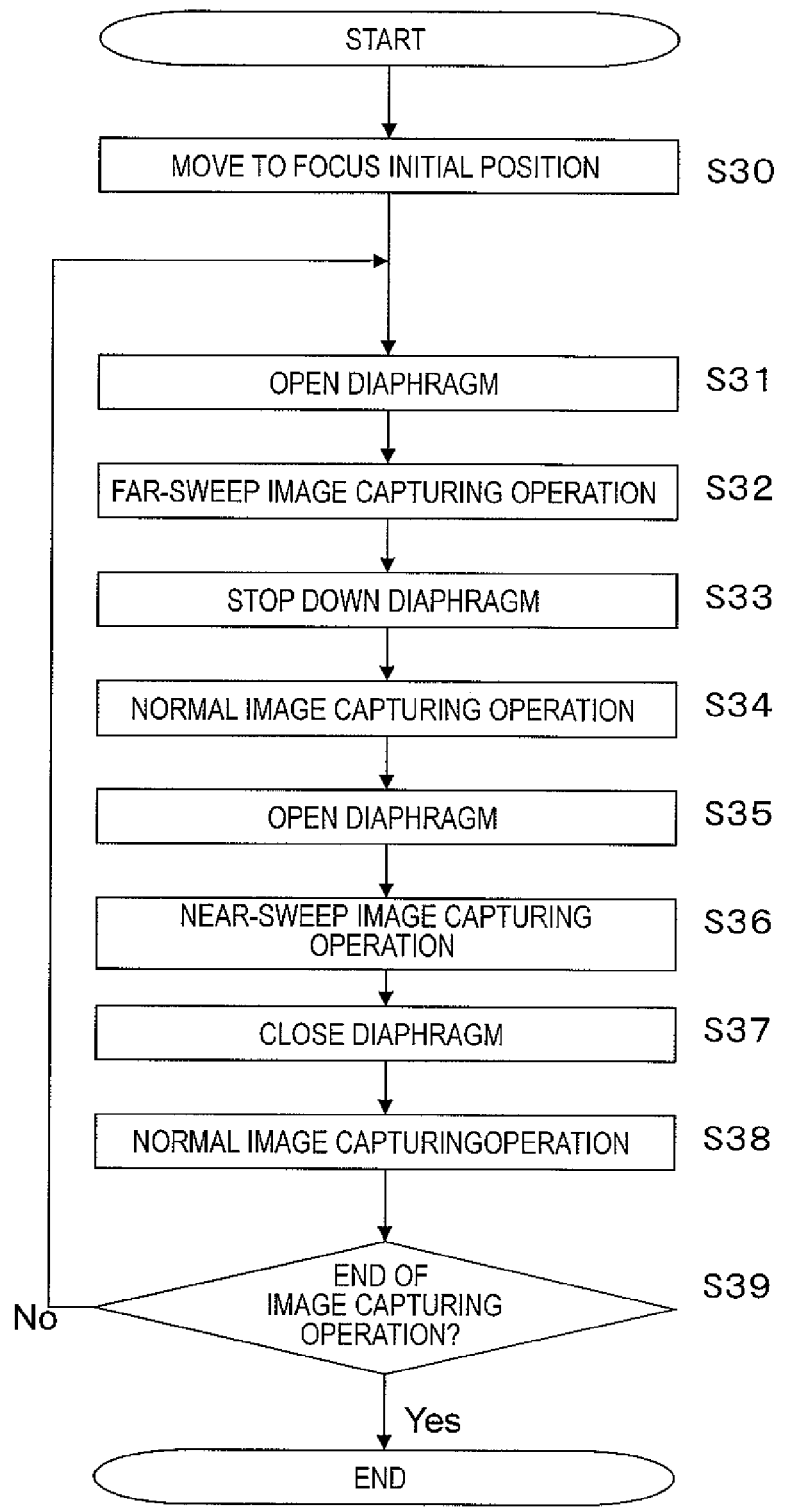
FIG. 11 is a flow chart illustrating the exposure/sweep step of Embodiment 4 in detail.

FIG. 11 is a flow chart showing a procedure of a sweep operation in an image capturing operation by the image capturing device of the present embodiment. FIGS. 12(a) and 12(b) show the focus lens displacement pattern and the change over time in the size of the aperture of the diaphragm, corresponding to FIGS. 4(a) and 4(b) of Embodiment 1.

Figure 12:
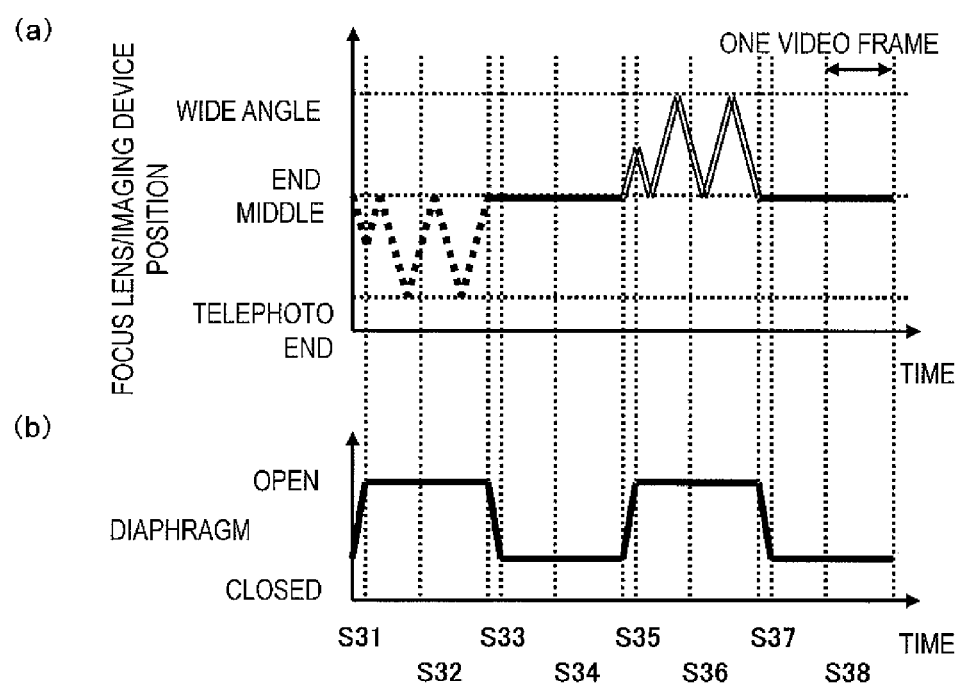
FIGS. 12(a) and 12(b) show the exposure sweep pattern and the change over time in the aperture of the diaphragm of Embodiment 4.

As shown in FIGS. 11 and 12, the process first moves the focus lens to the initial position (S30), and then changes the size of the aperture of the diaphragm in each of steps S31, S33, S35 and S37 and performs a reciprocal sweep operation for capturing an image in each of steps S32, S34, S36 and S38. While the size of the aperture of the diaphragm is changed (S31, S33, S35, S37), the imaging device is kept in a non-exposure state by the electronic shutter.

By performing a preliminary operation of offsetting the focus position in advance in steps S31 and S35 in which the size of the aperture of the diaphragm changes, as described above with reference to FIG. 10(d), the start position and the end position of the displacement pattern performed by the unit of two video frames where the focus lens is driven in a half-sweep motion can be matched with each other, making it possible for sweep operations to be smoothly continuous with one another.

By employing such a sweep pattern, even with an imaging device using a CMOS image sensor, it is possible to alternately obtain an all-in-focus image and a half-sweep image on a video frame by sandwiching the displacement pattern for the all-in-focus image between the near-sweep displacement pattern and the far-sweep displacement pattern for obtaining depth information. Therefore, it is possible to shoot a three-dimensional video as described in Embodiment 1.

Figure 13:
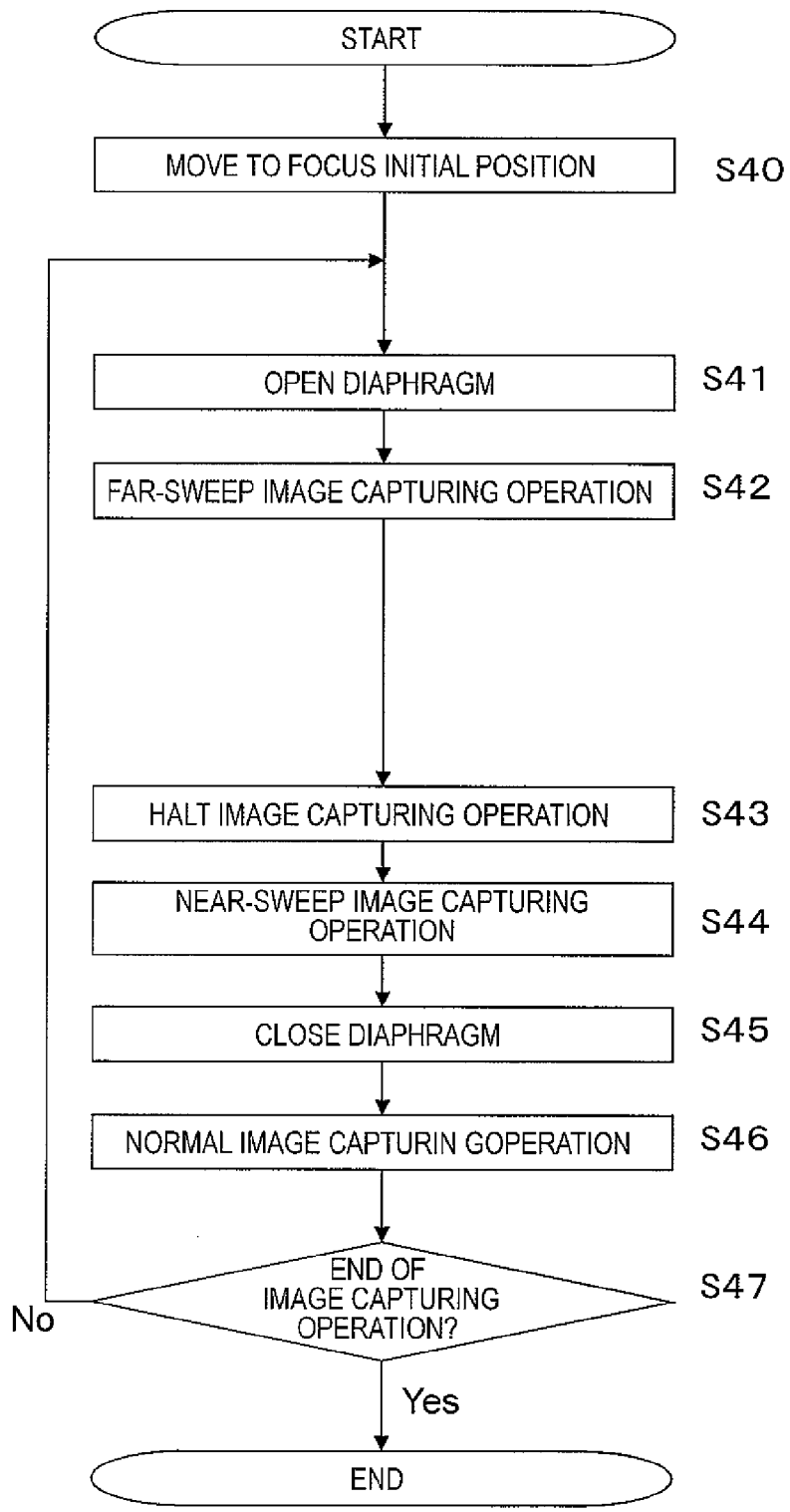
FIG. 13 is another flow chart illustrating the exposure/sweep step of Embodiment 4 in detail.
Figure 14:
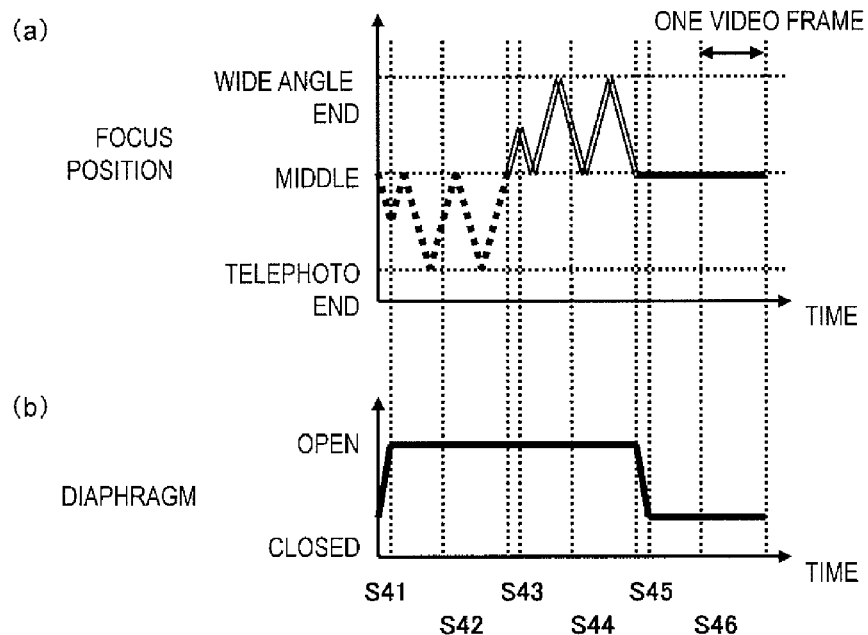
FIGS. 14(a) and 14(b) show another example of the exposure sweep pattern and the change over time in the aperture of the diaphragm of Embodiment 4.

Since an all-in-focus image can be captured twice over four video frames in this example, it is possible to obtain a three-dimensional video of 15 fps by using a CMOS-type imaging device capable of an image capturing operation at 60 fps, for example. These operations become more effective when combined with an imaging device capable of a high-speed read-out operation.

Where a CMOS image sensor is used as the imaging device of the image capturing device of Embodiment 2 described above with reference to FIGS. 5 and 6, the procedure by the flow chart shown in FIG. 13, and the sweep pattern operation and the diaphragm aperture control shown in FIGS. 14(a) and 14(b) are performed. In such a case, steps S20 to S27 of FIGS. 5 and 6 correspond to steps S40 to S47 shown in FIGS. 13 and 14(b), respectively.

The present embodiment can be combined with Embodiment 3. Specifically, the imaging device may be driven, instead of the focus lens. In such a case, the configuration of the image capturing device may be the same as the configuration shown in FIG. 7.

Thus, an image capturing device in which a CMOS image sensor that performs a rolling shutter operation is used as an imaging device is also capable of capturing a smooth and high-quality three-dimensional video, as in Embodiment 1. Moreover, it is possible to realize an image capturing device that is small and has a small power consumption.

Embodiment 5

In Embodiment 1 to Embodiment 4, an all-in-focus image is obtained by reducing the aperture of the diaphragm and deepening the depth of field. In such a case, when obtaining an all-in-focus image, the amount of light reaching the imaging device will be small. If the amount of light to the imaging device significantly decreases, S/N decreases, thus deteriorating the image quality. In view of this, the aperture amount may be limited so that the amount of light during an aperture imaging operation will not be below a predetermined threshold value. The threshold value may be determined based on the absolute value of the amount of light, or on the ratio with respect to the amount of light of a sweep image that is captured with the diaphragm fully open.

Specifically, the image capturing parameter determining section determines the size of the aperture of the diaphragm for obtaining an all-in-focus image in accordance with the brightness of the image capturing scene, i.e., the amount of light to be incident on the lens optical system. If the amount of light is smaller than the threshold value, the image capturing parameter determining section sets the aperture of the diaphragm to a predetermined size, irrespective of how smaller the amount of light is than the threshold value.

In such a case, the configuration may be such that the threshold value can be changed so as to allow the user to make a selection such that the depth of field is increased preferentially at the cost of deteriorating the image quality. Making it possible for the user to easily change the threshold value, it is possible to provide an image capturing device capable of capturing images under various conditions.

Thus, according to the present embodiment, when the image capturing scene is dark, it is possible to suppress deterioration of the image quality of the captured image. By the setting of the user, it is possible to choose between giving a higher priority to image quality or to obtaining three-dimensional information.

Embodiment 6

While the aperture amount of the diaphragm is limited when the amount of light incident on the lens optical system is below a predetermined threshold value in Embodiment 5, the amount of light incident on the imaging device may be slightly insufficient even if the diaphragm is fully open when an image capturing operation is done in a dark place. If one stops down the diaphragm so as to obtain an all-in-focus image in such a case, the amount of light further decreases, resulting in a very deteriorated image quality of the captured image.

In such a case, the image capturing device of the present embodiment captures an all-in-focus image by displacing the focus lens in a full sweep operation where the amount of sweep is limited while limiting the amount by which to stop down so that the aperture of the diaphragm will not be too small. Thus, it is possible to obtain an all-in-focus image with an increased depth of field without decreasing the amount of light incident on the imaging device.

The configuration of the image capturing device of the present embodiment may be the same as those of the image capturing devices of Embodiments 1 to 5. Therefore, the displacement pattern for the focus lens or the imaging device and the control of the aperture of the diaphragm will now be discussed particularly.

FIGS. 15(a) and 15(b) and FIGS. 16(a) and 16(b) each show the sweep pattern and the change over time in the size of the aperture of the diaphragm, corresponding to FIGS. 4(a) and 4(b). FIG. 15(a) shows a sweep pattern when using an imaging device which uses the global shutter operation, and FIG. 16(a) shows a sweep pattern when using an imaging device which uses the rolling shutter operation.

Figure 15:
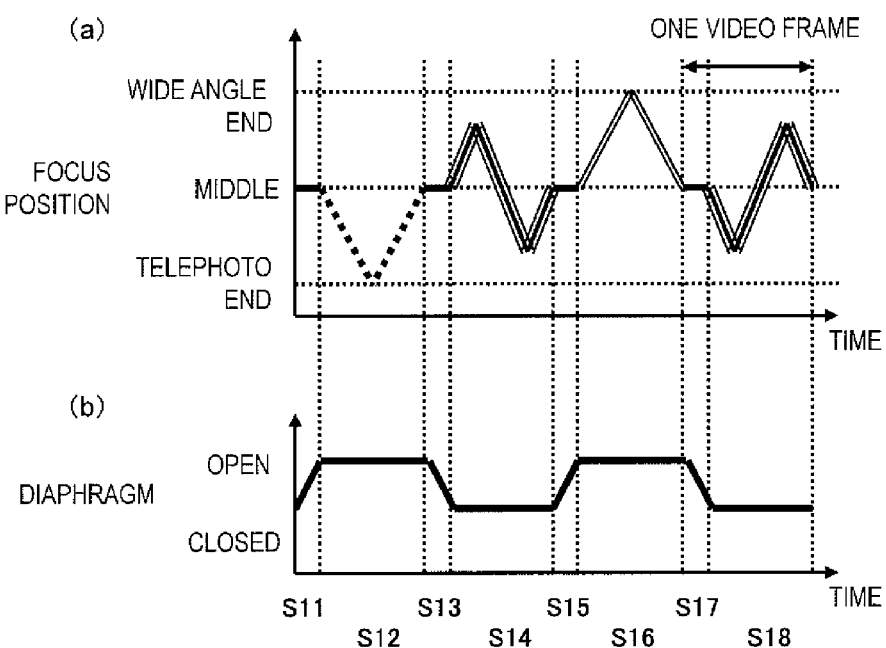
FIGS. 15(a) and 15(b) show another example of the exposure sweep pattern and the change over time in the aperture of the diaphragm of Embodiment 6.
Figure 16:
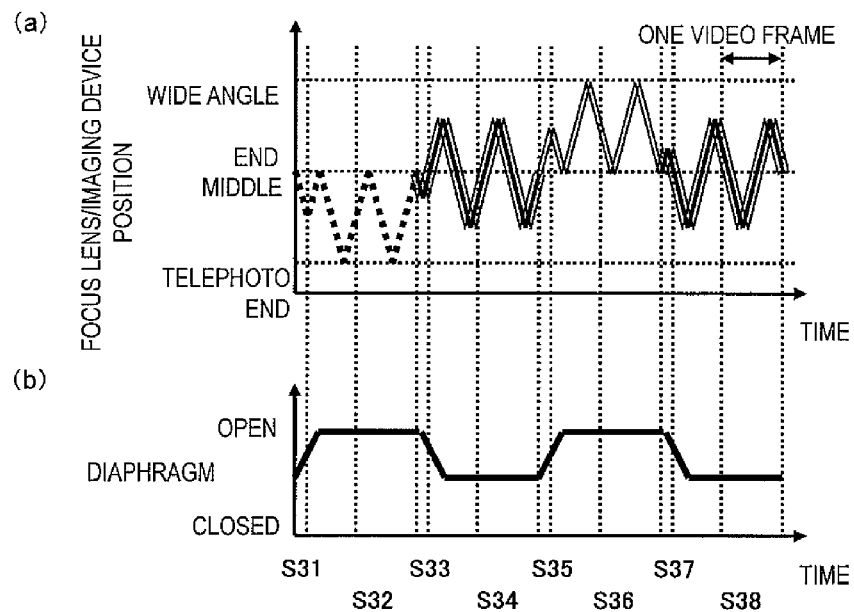
FIGS. 16(a) and 16(b) show another example of the exposure sweep pattern and the change over time in the aperture of the diaphragm of Embodiment 6.

As can be seen from these figures, in the present embodiment, the focus lens displacement pattern for obtaining an all-in-focus image (the first-type displacement pattern) produces a displacement across the entire section between a position that is closer to the wide angle end (the second focus position) than the telephoto end (the first focus position) and a position that is closer to the telephoto end than the wide angle end. When using a CCD image sensor, the displacement is started from the middle position in the section which has been set so as to make one reciprocation across the entire section over one video frame, as shown in FIG. 15(*a*). When using a CMOS image sensor, the displacement is started from the middle position in the section which has been set so as to move in two reciprocations across the entire section over two video frames, as shown in FIG. 16(*a*).

The length of the section is dependent on the amount of light incident on the imaging device and the size of the aperture of the diaphragm to be set. Specifically, by making the section longer as the amount of incident light is smaller, it is possible, by displacing the focus lens, to compensate for an insufficient amount of light, which makes it impossible to decrease the aperture of the diaphragm, thereby making the depth of field shallow.

Thus, according to the present embodiment, even when the image capturing scene is dark and the amount of light incident on the lens optical system is insufficient, it is possible to ensure an amount of light without excessively reducing the aperture of the diaphragm, and to widen the focus range by displacing the focus lens. Therefore, it is possible to obtain an all-in-focus image without deteriorating the S/N ratio. Thus, even if the image capturing scene is dark, it is possible to shoot a three-dimensional video without excessively deteriorating the image quality.

The displacement section in the focus lens displacement pattern for obtaining an all-in-focus image is shorter than the entire section between the telephoto end and the wide angle end. Therefore, the amount by which the focus lens is driven during an image capturing operation is smaller than that when displacing across the entire section between the telephoto end and the wide angle end, and it is therefore possible to reduce the power consumption of the image capturing device.

Note however that in the present embodiment, the focus lens may be displaced across the entire section between the telephoto end and the wide angle end in order to obtain an all-in-focus image.

Figure 17:
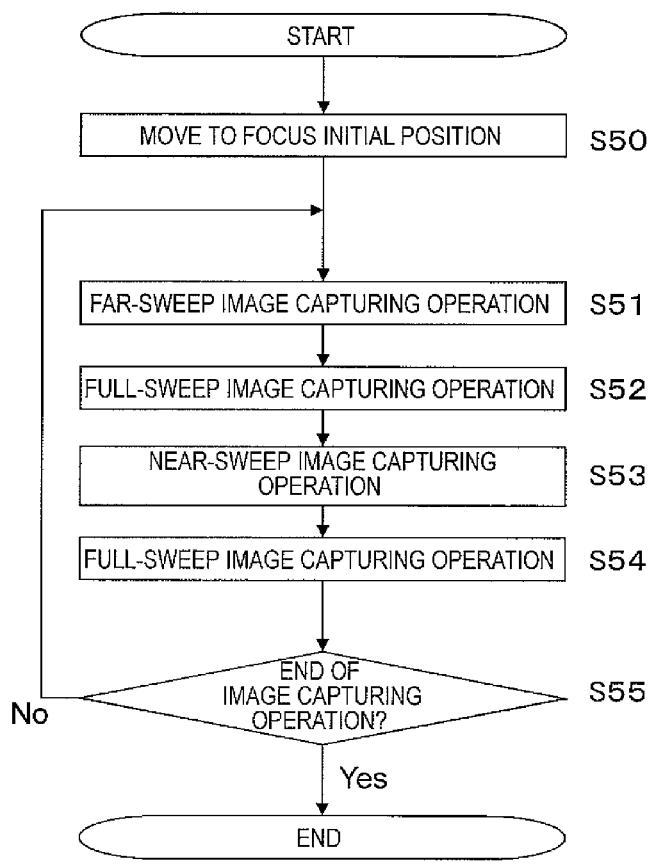
FIG. 17 is a flow chart illustrating the exposure/sweep step of Embodiment 6 in detail.

FIG. 17 is a flow chart showing the procedure of a sweep operation in such an embodiment. As compared with the flow chart shown in FIG. 3, the diaphragm driving step is eliminated, and the focus lens is displaced in a full-sweep motion across the entire section between the telephoto end and the wide angle end with the diaphragm stopped down and the focus position fixed. Since it is not necessary to drive the diaphragm in a video frame, the imaging device is not set in a non-exposure state while the size of the aperture of the diaphragm is changed by an electronic shutter. According to this embodiment, it is possible to obtain an all-in-focus image that is in focus across the entire range from the telephoto end to the wide angle end.

Figure 18:
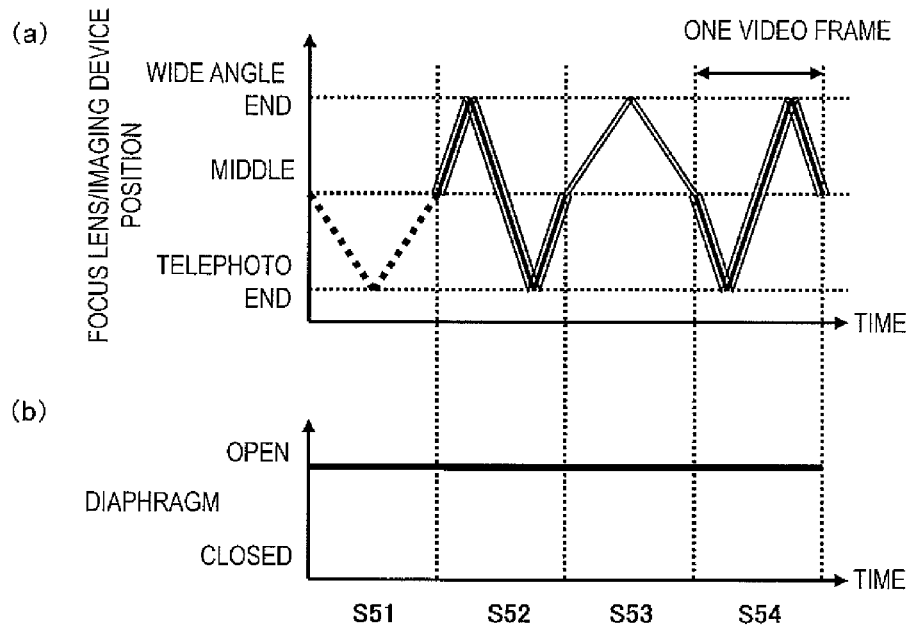
FIGS. 18(a) and 18(b) show another example of the exposure sweep pattern and the change over time in the aperture of the diaphragm of Embodiment 6.
Figure 19:
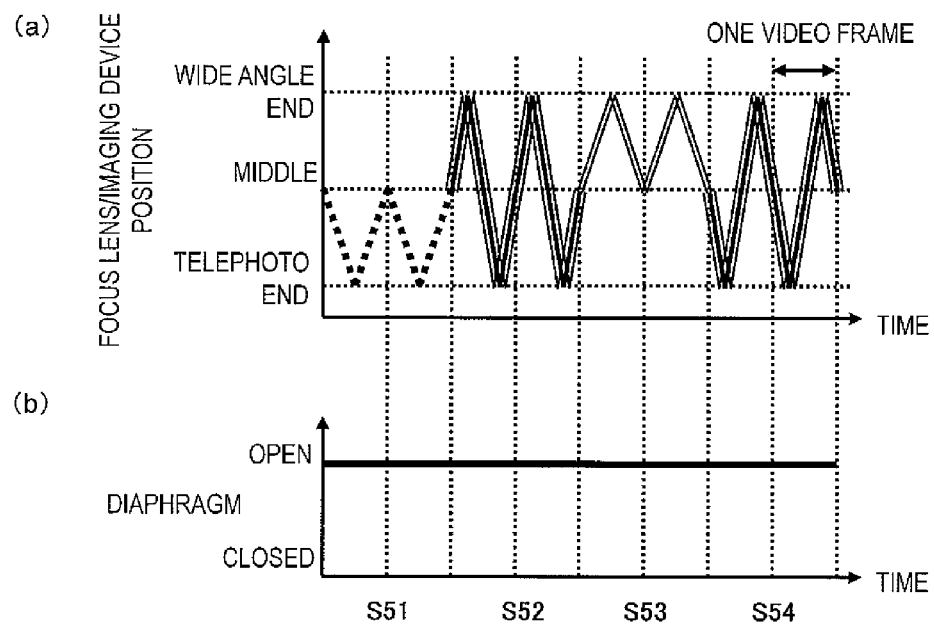
FIGS. 19(a) and 19(b) show another example of the exposure sweep pattern and the change over time in the aperture of the diaphragm of Embodiment 6.

FIG. 18 shows a sweep pattern when using an imaging device which uses the global shutter operation, and FIG. 19 shows a sweep pattern when using an imaging device which uses the rolling shutter operation. With either imaging device, the procedure of the sweep operation is in accordance with the procedure of the flow chart shown in FIG. 17.

As described above, where the image capturing scene is dark and the amount of light incident on the imaging device is insufficient, it is possible to obtain an all-in-focus image and shoot a three-dimensional video by performing a full-sweep image capturing operation with the diaphragm fixed in a completely open state. That is, it is possible to perform an image capturing operation by which a high image quality of an all-in-focus image and a high depth measurement precision are both realized, by using an all-in-focus image and a half-sweep image, where the all-in-focus image is obtained by deepening the depth of field by decreasing the aperture of the diaphragm or by driving the focus lens between the wide angle end side and the telephoto end side while the focus lens moves past the middle position between the wide angle end and the telephoto end.

Embodiment 7

As described above, if the size of the aperture of the diaphragm is varied between where an all-in-focus image is obtained and where an image by half sweep is obtained, the amount of light incident on the imaging device varies between these two images.

The image capturing device of the present embodiment adjusts the exposure time in an image capturing operation for obtaining a half-sweep image and an all-in-focus image, by using the electronic shutter of the imaging device. More specifically, the exposure time in a half-sweep image capturing operation is made shorter than the exposure time in an image capturing operation for obtaining an all-in-focus image.

Figure 20:
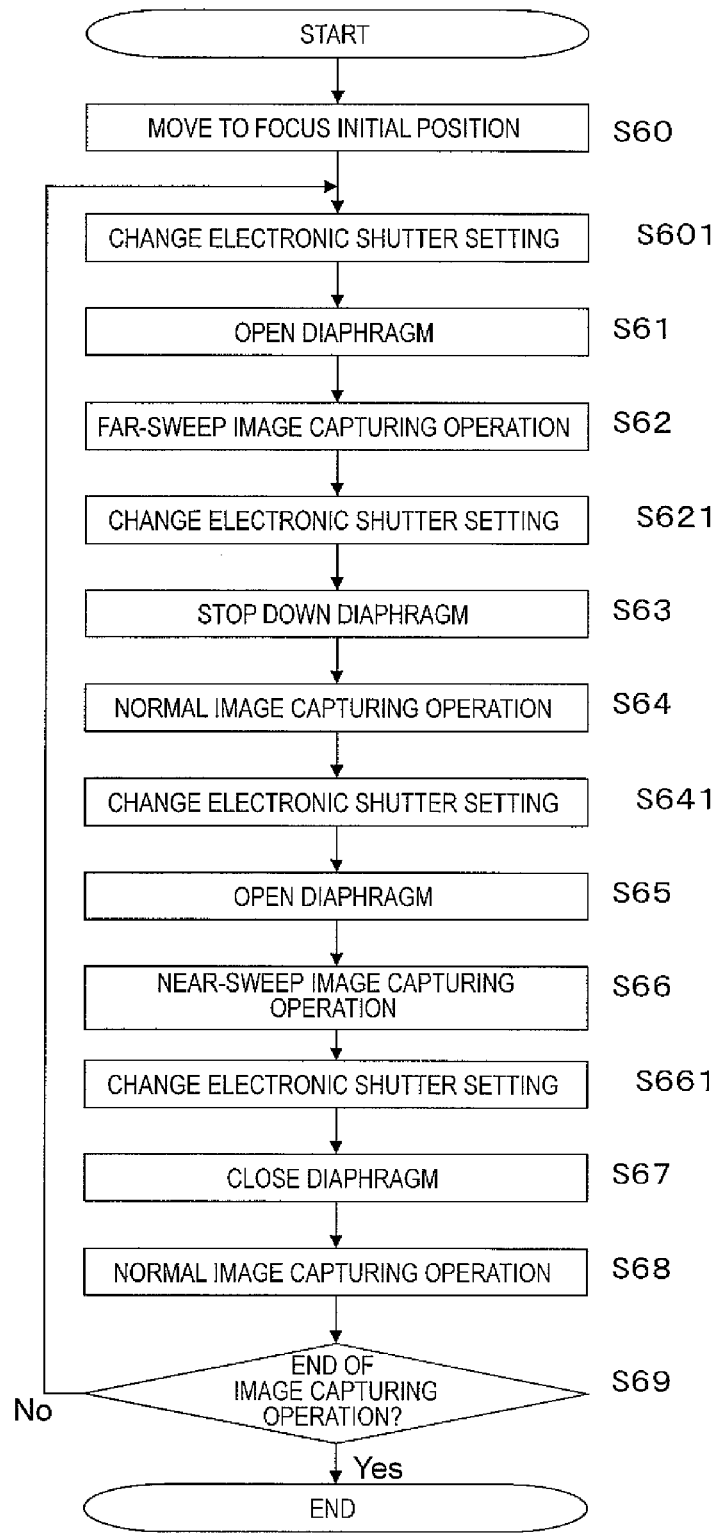
FIG. 20 is a flow chart illustrating the exposure/sweep step of Embodiment 7 in detail.
Figure 21:
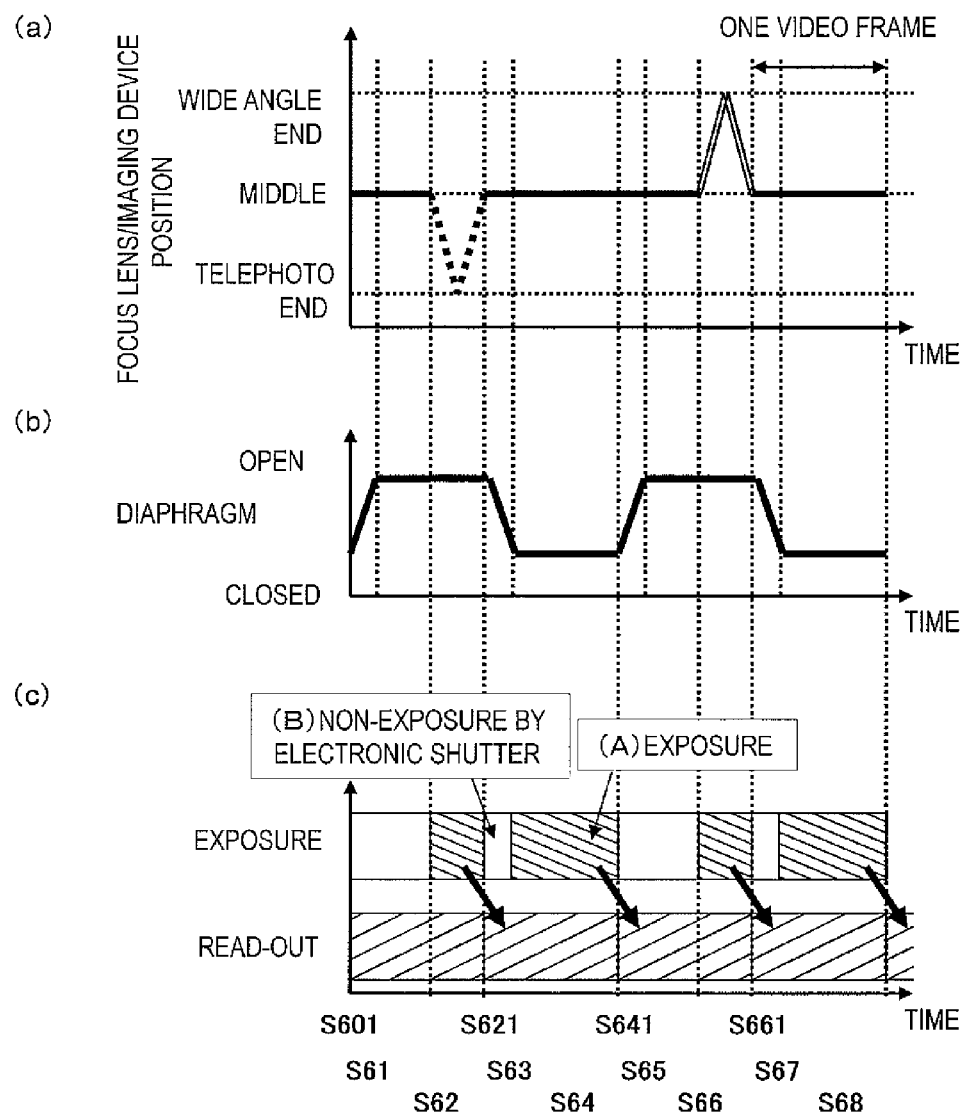
FIGS. 21(a), 21(b) and 21(c) show the exposure sweep pattern, the change over time in the aperture of the diaphragm, and the exposure and read-out timing of the imaging device of Embodiment 7.
Figure 22:
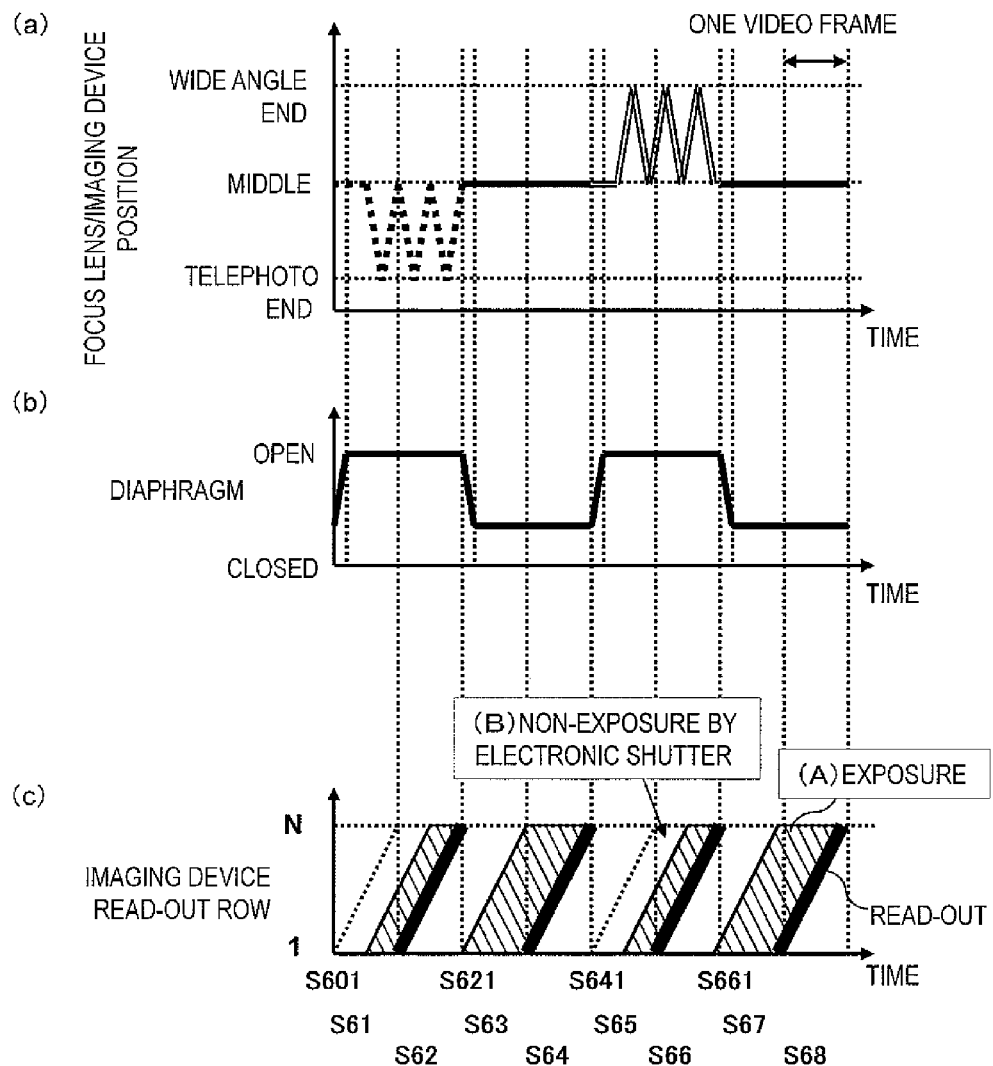
FIGS. 22(a), 22(b) and 22(c) show another example of the exposure sweep pattern, the change over time in the aperture of the diaphragm, and the exposure and read-out timing of the imaging device of Embodiment 7.

The image capturing device of the present embodiment has a similar structure to those of the image capturing devices of Embodiments 1 to 6. FIG. 20 is a flow chart showing the procedure of a sweep operation in an image capturing operation. In the present embodiment, the non-exposure time or the exposure time by the electronic shutter is set for the image capturing operation for each video frame. FIGS. 21(*a*), 21(*b*) and 21(*c*) show changes over time in the sweep pattern and the diaphragm where a CCD image sensor is used as the imaging device, and timing for the exposure and the read-out operation of the imaging device. FIGS. 22(*a*), 22(*b*) and 22(*c*) show changes over time in the sweep pattern and the diaphragm where a CMOS image sensor is used as the imaging device, and timing for the exposure and the read-out operation of the imaging device.

The procedure of the sweep operation according to the present embodiment will be described. As shown in FIG. 20, first, the focus lens is moved to the initial position (S60). Then, the non-exposure time or the exposure time by the electronic shutter, for example, is set in accordance with the ratio between the exposure time in a half-sweep image capturing operation and the exposure time in an image capturing operation for obtaining an all-in-focus image (S601).

Then, the diaphragm is fully opened (S61). In this process, the focus position is not changed but is held still at the initial position.

Then, a far-sweep operation of a half-sweep operation, which is a reciprocal sweep operation from the telephoto end to the middle position, is performed (S62). For the sweep pattern in this process, the sweep displacement velocity is increased so as to account for the shortening of the exposure time through the setting of the electronic shutter in S601.

Then, the setting of the electronic shutter is changed back to the setting before (S621). The focus is stopped and the diaphragm is stopped down to a predetermined amount (S63), and an image capturing operation is performed while the focus position is fixed (S64).

Then, the electronic shutter is set so that the exposure time is the same as that set in step S601 (S641).

After the diaphragm is fully opened again (S65), a near-sweep operation of a half-sweep operation, which is a reciprocal sweep operation from the telephoto end position to the middle focus position, is performed (S66). As described above, the sweep displacement velocity needs to be increased accounting for the shortening of the exposure time by the setting of the electronic shutter.

Then, the setting of the electronic shutter is changed back to the setting before (S661). The focus is stopped again and the diaphragm is stopped down to a predetermined amount (S67), and an image capturing operation is performed while the focus position is fixed (S68).

The sweep operation of the procedure from steps S61 to S68 described above is one cycle. When capturing a video, the operation of steps S61 to S68 can be continued repeatedly. During the periods of time in steps S61, S63, S65 and S67, when the size of the aperture of the diaphragm is being changed, the imaging device is in a non-exposure state by the electronic shutter as described above with reference to FIG. 3.

When the end of an image capturing operation is instructed, confirming a user input instructing the end of an image capturing operation (S69), the sweep operation is ended.

As described above, by changing the setting of the electronic shutter for each sweep image capturing operation, thereby adjusting the exposure time and changing the sweep velocity in accordance with the exposure time, it is possible to continuously obtain an all-in-focus image and a half-sweep image for depth information while correcting the change in the amount of light due to the change in the aperture amount of the diaphragm.

INDUSTRIAL APPLICABILITY

The image capturing device, the integrated circuit and the image capturing method disclosed in the present application are capable of alternately and continuously obtaining an all-in-focus image and depth information at a high speed, and can be used suitably for various image capturing devices of general and industrial use.

REFERENCE SIGNS LIST 100, 200, 300, 400 Image capturing device
101 Focus lens
102 Focus lens position detection section
103 Focus lens driving section
104 Imaging device
105 Focus lens displacement setting section
106 Focus lens displacement control section
107 Exposure/diaphragm/focus lens displacement synchronizing section
108 Read-out circuit
109 Image processing section
110 Recording section
111 Shutter
112 Shutter opening/closing instruction section
113 Release receiving section
114 Exposure time determination section
115 Diaphragm
116 Diaphragm driving section
117 Diaphragm displacement control section
118 Image capturing parameter determining section
120 Lens
121 Exposure/focus lens displacement synchronizing section
202 Imaging device position detection section
203 Imaging device driving section
205 Imaging device displacement setting section
206 Imaging device displacement control section
207 Exposure/diaphragm/imaging device displacement synchronizing section
208 Exposure/imaging device displacement synchronizing section

The invention claimed is:

1. An image capturing device comprising:
an imaging device including a plurality of photoelectric conversion elements arranged in two dimensions to form an image capturing surface, wherein the plurality of photoelectric conversion elements are exposed and the imaging device generates an image signal by reading out electrical signals from the plurality of photoelectric conversion elements;
a lens optical system including a focus lens for collecting light toward the imaging device;
a driving section for driving one of the imaging device and the focus lens so as to change a distance between the imaging device and the focus lens;
a displacement control section configured to, by outputting a command to the driving section, control displacement of the imaging device or the focus lens to be driven based on a predetermined displacement pattern;
a diaphragm having an aperture having a size which can be changed and being provided in the lens optical system;
an aperture control section configured to control the size of the aperture of the diaphragm;
a synchronizing section configured to control the displacement control section and the aperture control section based on exposure timing of the imaging device; and
an image capturing parameter determining section for determining a duration of the exposure, the size of the diaphragm aperture, and the displacement pattern, wherein:
the predetermined displacement pattern includes a first-type displacement pattern and a second-type displacement pattern by which the imaging device or the focus lens is displaced over different ranges between a first focus position of the focus lens or the imaging device at which focus is at a first object distance in an image capturing scene, and a second focus position of the focus lens or the imaging device at which focus is at a second object distance in the image capturing scene;
in the predetermined displacement pattern, the first-type displacement pattern and the second-type displacement pattern are repeated alternately; and
the aperture control section controls the diaphragm so as to have a first aperture and a second aperture having a different size from that of the first aperture in the first-type displacement pattern and the second-type displacement pattern based on timing from the synchronizing section.

2. The image capturing device of claim 1, wherein the first-type displacement pattern is not displaced from a middle position between the first focus position and the second focus position.

3. The image capturing device of claim 1, wherein the first-type displacement pattern is displaced over an entire section between a position closer to the second focus position than the first focus position and a position closer to the first focus position than the second focus position.

4. The image capturing device of claim 1, wherein the second-type displacement pattern includes:
a second F-type displacement pattern of which the displacement range is an entire section between the first focus position and a middle position between the first focus position and the second focus position; and a second N-type displacement pattern of which the displacement range is an entire section between the middle position and the second focus position.

5. The image capturing device of claim 4, wherein:
the first-type displacement pattern is sandwiched between the second F-type displacement pattern and the second N-type displacement pattern; and
the second F-type displacement pattern and the second N-type displacement pattern are not continuous with each other.

6. The image capturing device of claim 4, wherein:
the first-type displacement pattern is sandwiched between the second F-type displacement pattern and the second N-type displacement pattern; and
the second F-type displacement pattern and the second N-type displacement pattern are continuous with each other.

7. The image capturing device of claim 4, wherein:
the imaging device is a CMOS image sensor; and
the first-type displacement pattern, the second F-type displacement pattern and the second N-type displacement pattern are each displaced at least twice across an entire displacement range thereof.

8. The image capturing device of claim 1, wherein the first aperture is smaller than the second aperture.

9. The image capturing device of claim 8, wherein the image capturing parameter determining section determines the size of the first aperture and the size of the second aperture in accordance with an amount of incident light on the imaging device.

10. The image capturing device of claim 9, wherein if the amount of incident light is smaller than a threshold value, the image capturing parameter determining section sets the first aperture to a predetermined size, irrespective of a value of the amount of incident light.

11. The image capturing device of claim 1, wherein the image capturing parameter determining section determines the duration of the exposure and the first-type displacement pattern and the second-type displacement pattern in accordance with a ratio of an amount of incident light on the imaging device in the first-type displacement pattern and the second-type displacement pattern.

12. The image capturing device of claim 1, further comprising:
a position detection section for detecting a position of the imaging device or the focus lens to be driven,
wherein the displacement control section instructs the driving section of an amount of driving based on an output of the position detection section and the displacement pattern.

13. The image capturing device of claim 12, further comprising:
a read-out circuit for reading out the image signal from the imaging device,
wherein the synchronizing section controls the displacement control section and the read-out circuit based on exposure timing of the imaging device.

14. The image capturing device of claim 1, wherein an all-in-focus image is generated from an image signal obtained while the imaging device or the focus lens to be driven is displaced based on the first-type displacement pattern.

15. The image capturing device of claim 1, wherein depth information is generated from an image signal obtained while the imaging device or the focus lens to be driven is displaced based on the second-type displacement pattern.

16. The image capturing device of claim 1, wherein the imaging device is a CCD image sensor.

17. The image capturing device of claim 1, wherein the imaging device is a CMOS image sensor.

18. An integrated circuit of an image capturing device comprising: an imaging device including a plurality of photoelectric conversion elements arranged in two dimensions to form an image capturing surface, wherein the plurality of photoelectric conversion elements are exposed and the imaging device generates an image signal by reading out electrical signals from the plurality of photoelectric conversion elements; a lens optical system including a focus lens for collecting light toward the imaging device; a driving section for driving one of the imaging device and the focus lens so as to change a distance between the imaging device and the focus lens; and a diaphragm having an aperture having a size which can be changed and being provided in the lens optical system, the integrated circuit comprising:
a displacement control section configured to, by outputting a command to the driving section, control displacement of the imaging device or the focus lens to be driven based on a predetermined displacement pattern;
an aperture control section configured to control the size of the aperture of the diaphragm;
a synchronizing section configured to control the displacement control section and the aperture control section based on exposure timing of the imaging device; and
an image capturing parameter determining section for determining a duration of the exposure, the size of the diaphragm aperture, and the displacement pattern, wherein:
the predetermined displacement pattern includes a first-type displacement pattern and a second-type displacement pattern by which the imaging device or the focus lens is displaced over different ranges between a first focus position of the focus lens or the imaging device at which focus is at a first object distance in an image capturing scene, and a second focus position of the focus lens or the imaging device at which focus is at a second object distance in the image capturing scene;
in the predetermined displacement pattern, the first-type displacement pattern and the second-type displacement pattern are repeated alternately; and
the aperture control section controls the diaphragm so as to have a first aperture and a second aperture having a different size from that of the first aperture in the first-type displacement pattern and the second-type displacement pattern based on timing from the synchronizing section.

19. An image capturing method for forming an image of an image capturing scene by collecting light by a focus lens toward an imaging device, the imaging device including a plurality of photoelectric conversion elements arranged in two dimensions to form an image capturing surface, wherein the plurality of photoelectric conversion elements are exposed and the imaging device generates an image signal by reading out electrical signals from the plurality of photoelectric conversion elements, the image capturing method comprising:
determining a first-type displacement pattern and a second-type displacement pattern by which the imaging device or the focus lens is displaced over different ranges between a first focus position of the focus lens or the imaging device at which focus is at a first object distance in an image capturing scene, and a second focus position of the focus lens or the imaging device at which focus is at a second object distance in the image capturing scene; and exposing the plurality of photoelectric conversion elements using a diaphragm having a first aperture and a second aperture whose size is different from that of the first aperture respectively in the first-type displacement pattern and the second-type displacement pattern while displacing the focus lens or the imaging device alternately and repeatedly by the first-type displacement pattern and the second-type displacement pattern.

* * * * *